(12) United States Patent
Kanke et al.

(10) Patent No.: US 6,843,839 B2
(45) Date of Patent: Jan. 18, 2005

(54) INK, RECORDING METHOD, RECORDING UNIT, INK CARTRIDGE, INK SET, AND RECORDING APPARATUS

(75) Inventors: Tsuyoshi Kanke, Kanagawa (JP); Takao Yamamoto, Kanagawa (JP); Kumiko Mafune, Kanagawa (JP); Hisashi Teraoka, Shizuoka (JP); Yuko Yakushigawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 09/871,628

(22) Filed: Jun. 4, 2001

(65) Prior Publication Data

US 2002/0011178 A1 Jan. 31, 2002

(30) Foreign Application Priority Data

Jun. 12, 2000 (JP) ........................... 2000-176137
Jun. 12, 2000 (JP) ........................... 2000-176140

(51) Int. Cl.$^7$ .................. C09D 11/00; C09D 11/02; C07C 245/02; C09B 29/033; C07D 221/22
(52) U.S. Cl. .................. 106/31.47; 106/31.48; 106/31.51; 534/780; 534/864; 534/881; 534/842; 546/43; 546/74
(58) Field of Search .................. 106/31.47, 31.48, 106/31.51; 534/780, 864, 881, 842; 546/43, 74

(56) References Cited

U.S. PATENT DOCUMENTS 2,962,497 A 11/1960 Guenthard et al. ......... 260/249

(List continued on next page.)

FOREIGN PATENT DOCUMENTS

EP 0 359 376 A2 3/1990
EP 0 927 747 A1 7/1999

(List continued on next page.)

OTHER PUBLICATIONS

Database WPI Section Ch, Week 199009, Derwent Publications Ltd., XP–002172954, with resp ct to JP 2–16171A of Jan. 19, 1990.

*Primary Examiner*—Helene Klemanski
(74) *Attorney, Agent, or Firm*—Fitzpatrick, Cella, Harper & Scinto

(57) ABSTRACT

Magenta ink exhibiting excellent coloration on various recording materials is provided according to the present invention. The magenta ink can realize high image densities and can produce images having superior light resistance. The magenta ink contains first and second coloring materials represented by the following general formulae 1 and 2, respectively, and a water-based medium

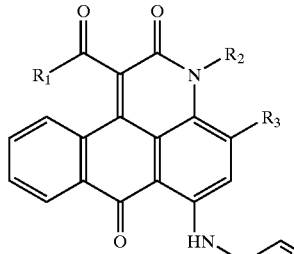

General formula 1

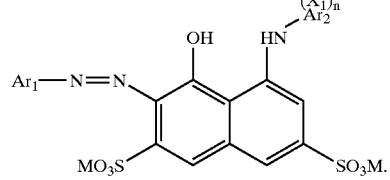

General formula 2

42 Claims, 14 Drawing Sheets

U.S. PATENT DOCUMENTS

| | | | |
|---|---|---|---|
| 4,446,470 A | 5/1984 | Sugiyama et al. | 346/140 R |
| 5,017,227 A | 5/1991 | Koike et al. | 106/31.27 |
| 5,218,376 A | 6/1993 | Asai | 346/1.1 |
| 5,429,671 A | 7/1995 | Yamamoto | 106/31.51 |
| 5,599,386 A | 2/1997 | Sano et al. | 106/31.48 |
| 5,686,951 A | 11/1997 | Koike et al. | 347/106 |
| 6,152,969 A | 11/2000 | Matsumoto et al. | 8/658 |
| 6,241,404 B1 | 6/2001 | Fietze et al. | 400/76 |
| 6,454,844 B1 * | 9/2002 | Kanaya | 106/31.48 |
| 6,460,988 B1 * | 10/2002 | Mafune et al. | 347/100 |
| 6,471,760 B1 * | 10/2002 | Matsumoto et al. | 106/31.47 |
| 6,482,256 B1 * | 11/2002 | Kanaya et al. | 106/31.51 |
| 2002/0050225 A1 * | 5/2002 | Mafune et al. | 106/31.27 |
| 2002/0093557 A1 * | 7/2002 | Takuhara et al. | 347/100 |

FOREIGN PATENT DOCUMENTS

| | | |
|---|---|---|
| EP | 1 063 268 A1 | 12/2000 |
| EP | 1 067 155 A1 | 1/2001 |
| JP | 57-197191 A | 12/1982 |
| JP | 61-59911 B2 | 12/1986 |
| JP | 61-59912 B2 | 12/1986 |
| JP | 61-59914 B2 | 12/1986 |
| JP | 2-16171 A | 1/1990 |
| JP | 2-127482 A | 5/1990 |
| JP | 2783647 B2 | 1/1992 |
| JP | 8-73791 A | 3/1996 |
| JP | 10-306221 A | 11/1998 |
| JP | 11-209673 A | 8/1999 |
| JP | 11-315230 A | 11/1999 |
| JP | 2000-109464 A | 4/2000 |
| JP | 2000-169776 A | 6/2000 |

* cited by examiner

AFTER 1 μS

AFTER 7 μS

INK, RECORDING METHOD, RECORDING UNIT, INK CARTRIDGE, INK SET, AND RECORDING APPARATUS

BACKGROUND OF THE INVENTION

1. Field of the Invention

The present invention relates to ink. In particular, the present invention relates to an ink suitable for ink-jet recording in which recording is performed on a recording material by ejecting the ink from an orifice in response to recording signals, as well as to an ink-jet recording method, an ink cartridge, a recording unit, an ink set, and an ink-jet recording apparatus.

2. Description of the Related Art

In the ink-jet recording method, recording is performed by adhering ejected ink droplets to a recording material, for example, paper. In particular, according to the ink-jet recording method, the printing of color images can be performed with ease. Liquid droplets are generated by bubbles that are generated in the ink due to the application of thermal energy using an electrothermal transducer as the ejection energy supply device, as disclosed in Japanese Patent Publication No. 61-59911, Japanese Patent Publication No. 61-59912, and Japanese Patent Publication No. 61-59914. In recent years, regarding ink-jet recording apparatuses, costs have been reduced and printing speeds have been improved, and regarding ink-jet recording images, image qualities have been further improved. In addition, color ink-jet recordings have been used for various purposes.

In color recordings made by an ink-jet recording method, water-based inks, in which dyes having various color tones are dissolved into the water-soluble media, may, for example, be used. These inks preferably satisfy, at high levels, at least the following properties (1) to (10), which are required of ink-jet recordings.

(1) The recording has a sufficient image density.
(2) The recording is likely to dry on a recording material.
(3) There is no blurring in the recorded image.
(4) The recorded image does not bleed due to contact with water, alcohol, etc.
(5) The recorded image is superior in light resistance.
(6) Plugging in the nozzle tip does not occur.
(7) Problems of fading of the recorded image, etc., do not occur during continuous printing or at the start of recording after a long term of standing.
(8) The ink is stable during preservation.
(9) No problems are caused by contact with members constituting the recording device during use.
(10) The recording is superior in heat resistance and does not adversely affect the thermal energy generation element.

Among the inks of various color tones used for the color recordings, azo dyes and xanthene dyes which can produce magenta inks having superior color tones are the typical dyes used for a water-based ink having a magenta color. The aforementioned magenta ink having superior color tone makes the realization of an ink-jet image having a high quality comparable to a silver halide photograph possible. In recent years, however, regarding ink-jet recording images, not only high image quality, but also high durability of the formed image has been required.

SUMMARY OF THE INVENTION

On the other hand, according to research by the inventors of the present invention, it was confirmed that the azo-based and the xanthene-based magenta dyes used hitherto for conventional magenta inks were inferior in light resistance compared to the dyes used for other color inks, and when color ink-jet images formed using these magenta inks were evaluated with light resistance tests of a longer term than the conventional tests, the color images lost their color balance due to the fading of the magenta color. The inventors of the present invention confirmed that improvement in the light resistance of an ink image having a magenta color was necessary from the viewpoint of further improvement in the durability of the color image produced by the ink-jet recording method.

In a case in which a magenta ink using dyes, such as azo dyes and xanthene dyes, exhibiting excellent coloration as the coloring material and a cyan ink using copper phthalocyanine dye having superior light resistance and color tone as the coloring material are concurrently used, be the fading of the magenta dye, in a color mixed portion of the cyan ink and the magenta ink, sometimes becomes remarkable compared to that in a monochrome portion, so that the image may lose its color balance as a whole and the image quality may become remarkably inferior.

Regarding the aforementioned technical problem of the acceleration of photodegradation in the color mixed image of magenta ink and cyan ink, new magenta inks have been suggested. For example, in Japanese Patent Laid-Open No. 2-127482, it is suggested that the fading due to light in the highlighted part is prevented by using at least two magenta inks having different concentrations, that is, a dye exhibiting superior sharpness is used as the deep ink and a dye, in which the fading due to light in the color mixed portion is not likely to be accelerated, is used as the light dye. In Japanese Patent Laid-Open No. 11-315230, it is suggested that the fading in the color mixed portion of the image is prevented by adding a dye having a xanthene structure as a light resistance imparting agent into a magenta ink containing an azo dye, with the ratio of the light resistance imparting agent to the coloring material being within the range of 0.03 to 0.5.

According to the research of the inventors of the present invention, however, it was believed that the aforementioned technique described in Japanese Patent Laid-Open No. 2-127482 was a very effective technique for preventing the color balance of the color image from varying with time, although in consideration of the recent demand by consumers for high reproducibility of a photorealistic color image, further improvement was necessary regarding the color tone change due to the interaction of the coloring materials that occurred in the color mixed portion of the deep magenta ink and the cyan ink. Furthermore, regarding the aforementioned technique described in Japanese Patent Laid-Open No. 11-315230, it was believed that the effect of accelerating the fading of the color image was thereby prevented; however, the magenta ink itself had to be further improved in light resistance.

Accordingly, the present invention provides an ink that satisfies the properties required of an ink used for ink-jet recording, exhibits excellent coloration property in recording on various recording materials, that can realize a high image density, and furthermore, that can impart superior light resistance to the resulting image. In particular, the present invention provides an ink having a magenta color. The present invention also provides a recording method by which an image having superior color tone can be produced, and the color tone of the formed image is not likely to fade. The present invention further provides a recording unit, an ink cartridge, an ink set, and a recording apparatus each using the aforementioned ink having superior effects.

The present invention further provides an ink set including a new magenta ink that can produce a beautiful and clean color image exhibiting superior coloration, even when the image includes a color mixed portion, by further improvement of the light resistance of the magenta dye in a color mixed portion that includes the cyan ink and the magenta ink. The resulting color image has superior light resistance and is not likely to fade after a long term of preservation. In particular, the fading of the magenta color, which was remarkable in an image having a color mixed portion having a magenta ink and a cyan ink containing a copper phthalocyanine dye, is effectively prevented, so that the superior image quality can be maintained under severe conditions. The present invention further provides an ink-jet recording method for producing the aforementioned color image having superior light resistance, a recording unit, an ink cartridge, and a recording apparatus.

The ink according to one aspect of the present invention includes a first coloring material represented by the following general formula 1, a second coloring material represented by the following general formula 2, and an aqueous medium:

General formula 1

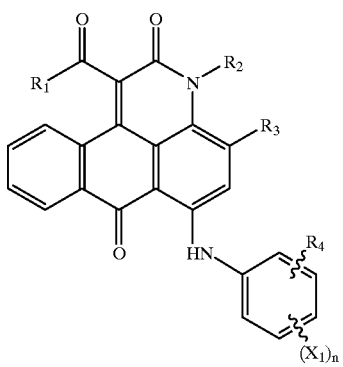

wherein $R_1$ represents a substituted or an unsubstituted alkoxy group, or a substituted or an unsubstituted aryl group, $R_2$ and $R_4$ represent, independently, a hydrogen atom, or a substituted or an unsubstituted alkyl group, $R_3$ represents one substituent selected from the group consisting of a hydrogen atom, a substituted or an unsubstituted alkyl group, a substituted or an unsubstituted alkoxy group, a substituted or an unsubstituted aryloxy group, and a halogen atom, $X_1$ represents a carboxyl group or a salt thereof, or a sulfonic acid group or a salt thereof, and n represents 1 or 2.

General formula 2

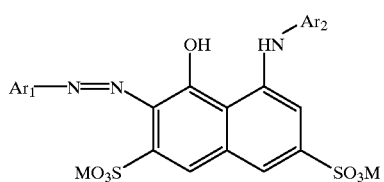

wherein $Ar_1$ represents a substituted or an unsubstituted phenyl group, or a substituted or an unsubstituted naphthyl group, $Ar_2$ represents an acetyl group, a benzoyl group, a 1,3,5-triazinyl group, a $SO_2$—$C_6H_5$ group, or a $SO_2$—$C_6H_4$—$CH_3$ group, M represents a counter ion to a sulfonic acid group which is selected from the group consisting of a hydrogen atom, an alkali metal, an ammonium, and an organic ammonium.

The ink according to another aspect of the present invention includes at least one of C.I. Acid Red 52 and C.I. Acid Red 289, a coloring material represented by the aforementioned general formula 1, and an aqueous medium.

The ink according to the present invention preferably includes at least one of C.I. Acid Red 52 and C.I. Acid Red 289, in addition to the coloring material represented by the aforementioned general formula 1, the coloring material represented by the aforementioned general formula 2, and an aqueous medium. According to this embodiment, there is an effect of providing magenta ink which can produce an image having superior color tone and having superior durability.

The ink according to the present invention preferably includes the first coloring material represented by the aforementioned general formula 1, the second coloring material represented by the aforementioned general formula 2, C.I. Acid Red 289, and an aqueous medium. This ink has especially superior color tone and can produce an image having superior durability, so that this ink is preferable.

The aforementioned inks according to the various embodiments of the present invention can also be very preferably used as inks for ink-jet recording.

The ink set according to another aspect of the present invention includes the combination of at least one ink selected from the group consisting of yellow ink, cyan ink, and black ink, and one of the magenta inks according to the aforementioned various embodiments.

The ink set according to the present invention preferably includes the combination of the cyan ink and one of the aforementioned various magenta inks according to the present invention.

In particular, regarding the aforementioned ink set, in the case in which a cyan ink containing a coloring material having a copper phthalocyanine structure is included, there is an effect of very effectively mitigating the phenomenon of the acceleration of fading, which was hitherto observed in the color mixed portion of the magenta ink and the cyan ink. The aforementioned ink set is also made to be suitable for the purpose of the ink-jet recording.

The ink-jet recording method according to another aspect of the present invention includes the step of ejecting one of the aforementioned various magenta inks, according to the present invention, for ink-jet recording from an orifice in response to a recording signal.

The ink-jet recording method according to the present invention preferably includes the steps of ejecting one of the aforementioned various magenta inks for ink-jet recording according to the present invention, from an orifice in response to a recording signal, and ejecting a cyan ink comprising a dye having a copper phthalocyanine structure from the orifice in response to a recording signal. At least one of the magenta ink and the cyan ink may be ejected from the orifice by applying thermal energy to the ink. In this aspect, in the case in which the color mixed portion is formed by overlapping the magenta ink and the cyan ink on a recording material, the acceleration of fading, which was hitherto observed in the color mixed portion of the conventional magenta ink and the cyan ink, can be effectively prevented.

The recording unit according to another aspect of the present invention is provided with an ink storage portion storing one of the aforementioned various magenta inks according to the present invention for ink-jet recording, and a head portion for ejecting the ink.

The recording unit according to the present invention is preferably provided with an ink storage portion storing each of the inks constituting one of the aforementioned various ink sets of the present invention for ink-jet recording, and a head portion for ejecting the ink.

The ink cartridge according to another aspect of the present invention is provided with an ink storage portion storing one of the aforementioned various inks according to the present invention.

The ink cartridge according to the present invention is preferably provided with an ink storage portion storing each of the inks constituting one of the aforementioned various ink sets according to the present invention.

The ink-jet recording apparatus according to another aspect of the present invention is provided with a recording head for ejecting one of the aforementioned various magenta inks according to the present invention for ink-jet, an ink cartridge including an ink storage portion storing the ink, and an ink supply portion for supplying the ink from the ink cartridge to the recording head.

The ink-jet recording apparatus of the present invention is preferably provided with at least one ink, for ink-jet recording, selected from the group consisting of yellow ink, cyan ink, and black ink, one of the aforementioned various magenta inks according to the present invention for ink-jet recording, and a recording head for ejecting each of these inks.

The ink-jet recording apparatus according to the present invention is preferably provided with a cyan ink for ink-jet recording, one of the aforementioned various magenta inks according to the present invention for ink-jet recording, and a recording head for ejecting each of these inks.

Further objects, features and advantages of the present invention will become apparent from the following description of the preferred embodiments with reference to the attached drawings.

DESCRIPTION OF THE PREFERRED EMBODIMENTS

Figure 1:
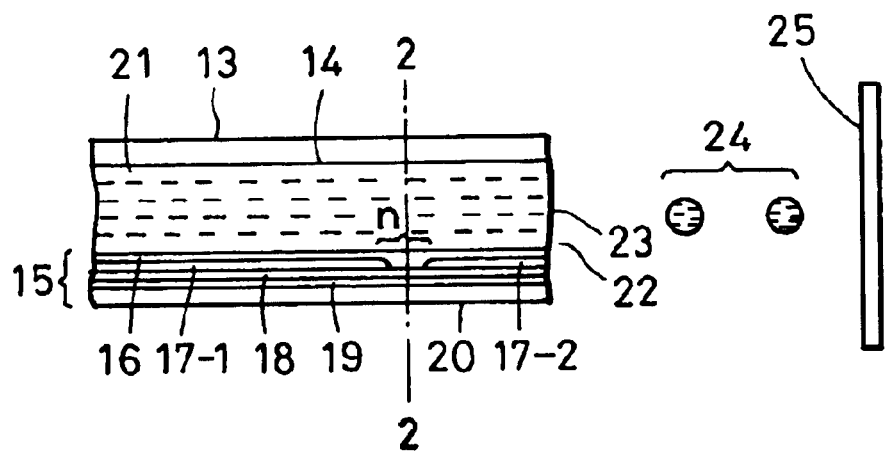
FIG. 1 is a vertical sectional view of a head portion of an ink-jet recording apparatus.

The present invention will be explained below by using the preferred embodiments.

In consideration of the aforementioned objects, the inventors of the present invention investigated various magenta dyes. During the process thereof, at least one of an azo-based magenta dye and a xanthene-based magenta dye, and a magenta dye having an anthrapyridone skeleton were combined to prepare ink, and the resulting ink and an image formed therewith were evaluated. As a consequence, it was discovered that an ink having the aforementioned constitution satisfied the aforementioned properties (1) to (10) at high levels, had a superior tint usable for forming a photo-realistic image, and the image formed using the aforementioned ink had extremely superior light resistance, so that the present invention was made.

That is, according to the research of the inventors of the present invention, it was made clear that the light resistance of an image produced using the ink having the aforementioned constitution exceeded, by a large degree, the light resistance predicted based on the light resistance of an image produced using an ink prepared from the azo dye only. Although the reason for the aforementioned result is not clear, it is believed that the interaction between the dye molecules generated due to the concurrent use of a plurality of coloring materials, etc., contribute thereto.

Regarding the conventional water-based inks having a magenta color and the recording methods using them, in Japanese Patent Laid-Open No. 2-16171, etc., a water-based dye ink having a magenta color using a dye having an anthrapyridone skeleton and the superior light resistance thereof are disclosed. In Japanese Patent Laid-Open No. 57-197191, an ink-jet color printing method using a water-based dye ink having a magenta color containing a dye having an anthrapyridone skeleton is disclosed. In these inventions, however, there is no disclosure regarding the technique of mixing the anthrapyridone-based magenta dye and another magenta dye. Furthermore, there is no indication regarding the effect of improving the light resistance of the image formed by the mixed ink.

In addition, in Japanese Patent Laid-Open No. 10-306221 (U.S. Pat. No. 6152969) and Japanese Patent Laid-Open No. 2000-109464 (EP 1067155), inks containing anthrapyridone compounds having structures similar to that of the present invention are also disclosed. There is, however, no disclosure regarding the aforementioned features of the present invention, and there is no indication regarding the effect of the present invention. In Japanese Patent Laid-Open No. 2000-169776 (corresponding to WO A1 9946341 and EP 1063268A1), inks containing anthrapyridone compounds are also disclosed. There is, however, no disclosure regarding the aforementioned features of the present invention.

First Embodiment

Coloring Material

The ink according to one aspect of the present invention includes coloring materials and an aqueous medium, in which a first coloring material represented by the following general formula 1 and a second coloring material represented by the following general formula 2 are used concurrently.

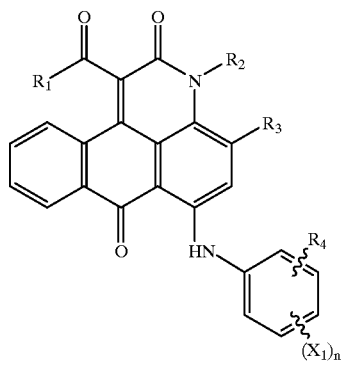

General formula 1

In the aforementioned general formula 1, $R_1$ represents a substituted or unsubstituted alkoxy group, or a substituted or unsubstituted aryl group, $R_2$ and $R_4$ represent, independently, a hydrogen atom, or a substituted or unsubstituted alkyl group, $R_3$ represents one substituent selected from the group consisting of a hydrogen atom, a substituted or unsubstituted alkyl group, a substituted or unsubstituted alkoxy group, a substituted or unsubstituted aryloxy group, and a halogen atom, $X_1$ represents a carboxyl group or a salt thereof, or a sulfonic acid group or a salt thereof, and n represents 1 or 2.

Regarding $R_1$ to $R_4$ in the aforementioned general formula 1, specifically, as $R_1$, for example, a straight chain or a branched chain alkoxy group having 1 to 4 carbons, and a substituted or unsubstituted phenyl group can be mentioned. Herein, as the substituent for the phenyl group, for example, a methyl group, a hydroxyl group, a nitro group, a sulfonic acid group or a salt thereof, a carboxyl group or a salt thereof, and a halogen atom (fluorine, chlorine, bromine, etc.) can be mentioned. As $R_2$, for example, a hydrogen atom, and a straight chain or a branched chain lower alkyl group having 1 to 4 carbons, can be mentioned. As $R_3$, for example, a hydrogen atom, a straight chain or a branched chain alkyl group having 1 to 4 carbons, a straight chain or a branched chain alkoxy group having 1 to 4 carbons, and as an aryloxy group, for example, a phenoxy group can be mentioned. An aryl group constituting the aryloxy group may be substituted by, for example, a straight chain and a branched chain alkyl group having 1 to 10 carbons, a sulfonyl group and a salt thereof, and a carboxyl group and a salt thereof. As $R_4$, for example, a hydrogen atom, and a straight chain or a branched chain lower alkyl group having 1 to 4 carbons, can be mentioned. As $X_1$, for example, —COOM and —SO$_3$M can be mentioned, wherein M represents a hydrogen atom, an alkali metal (e.g., Li, Na), an ammonium (NH$_4$), or an organic ammonium (N(R$_5$)$_4$). Herein, as $R_5$, a methyl group, ethyl group, etc., can be mentioned.

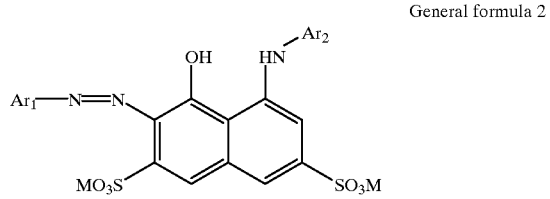

General formula 2

In the aforementioned general formula 2, $Ar_1$ represents a substituted or unsubstituted phenyl group, or a substituted or unsubstituted naphthyl group, $Ar_2$ represents an acetyl group, a benzoyl group, a 1,3,5-triazinyl group, a SO$_2$—C$_6$H$_5$ group, or a SO$_2$—C$_6$H$_4$—CH$_3$ group, M represents a counter ion to a sulfonic acid group which is selected from the group consisting of a hydrogen atom, an alkali metal (e.g., Li, Na), an ammonium (NH$_4$), and an organic ammonium (N(R$_6$)$_4$). Herein, as $R_6$, a methyl group, ethyl group, etc., can be mentioned. The phenyl or naphthyl group for $Ar_1$ may be substituted by at least one group or atom selected from the group of, for example, a carboxyl group or a salt thereof, a sulfonic acid group or a salt thereof, a straight chain or a branched chain alkyl group having 1 to 4 carbons, a halogen atom (fluorine, chlorine, bromine, etc.), an alkoxy group having 1 to 4 carbons, and an aryloxy group, e.g., a phenoxy group. In the case in which the aforementioned $Ar_2$ is a benzoyl group or a 1,3,5-triazinyl group, at least one hydrogen atom of the benzene ring or the 1,3,5-triazine ring may be substituted with, for example, at least one selected from the group consisting of a carboxyl group or a salt thereof, a halogen atom (fluorine, chlorine, bromine, etc.), a primary amino group, a secondary amino group, a tertiary amino group, alkoxy group, hydroxy group, etc.

An image having a magenta color and produced using the ink containing the first and the second coloring materials represented by the aforementioned general formulae 1 and 2, respectively, exhibits extremely superior color tone and exhibits superior lightfastness compared to the lightfastness predicted based on an ink containing the azo dye only as the coloring material.

As the specific examples of the first coloring material represented by the general formula 1, example compounds 1 to 7 are described below, although the present invention is not limited to those coloring materials. At least two kinds of those coloring materials may be used concurrently.

Example Compound 1

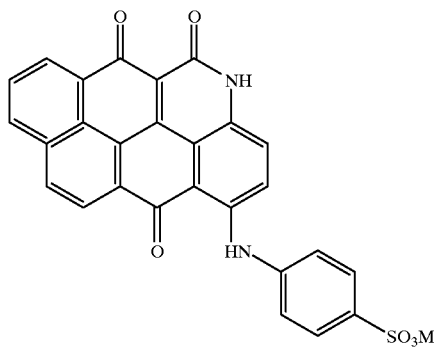

(M = H, Li, Na, $NH_4$, $N(R_5)_4$)

Example Compound 2

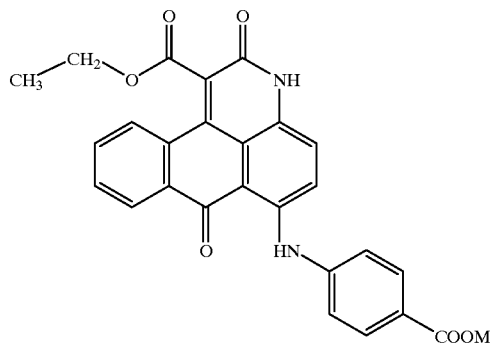

(M = H, Li, Na, $NH_4$, $N(R_5)_4$)

Example Compound 3

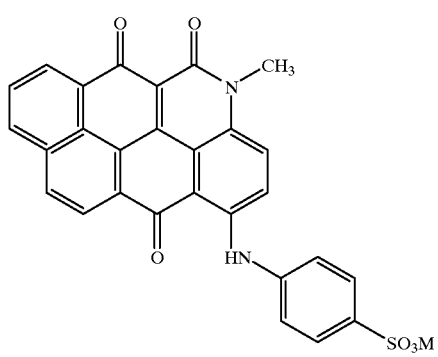

(M = H, Li, Na, $NH_4$, $N(R_5)_4$)

Example Compound 4

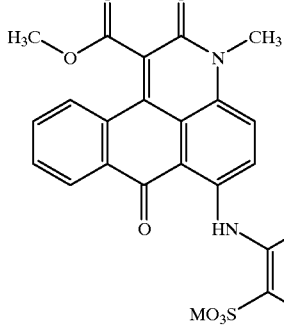

(M = H, Li, Na, $NH_4$, $N(R_5)_4$)

Example Compound 5

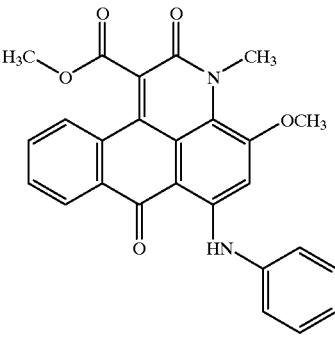

(M = H, Li, Na, $NH_4$, $N(R_5)_4$)

Example Compound 6

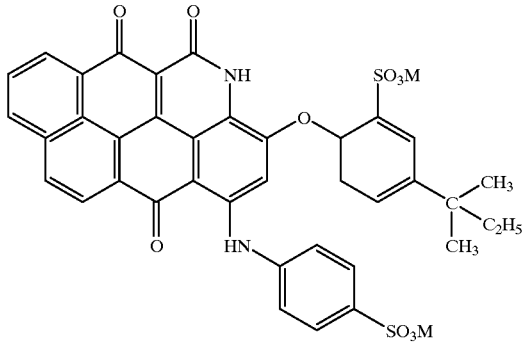

(M = H, Li, Na, $NH_4$, $N(R_5)_4$)

Example Compound 7

(M = H, Li, Na, $NH_4$, $N(R_5)_4$)

As the coloring material which is a compound represented by the general formula 2 used in the present invention, for example, C.I. Reactive Red 180, example compounds 8 to 13 having the following structures, and compounds having the structures described in Japanese Patent Laid-Open No. 8-73791, Japanese patent Laid-Open No. 11-209673, etc., may be mentioned.

Example Compound 8

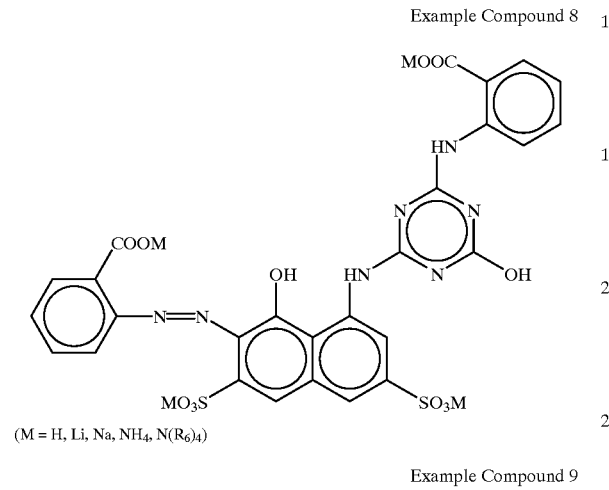

(M = H, Li, Na, NH$_4$, N(R$_6$)$_4$)

Example Compound 9

Example Compound 10

Example Compound 11

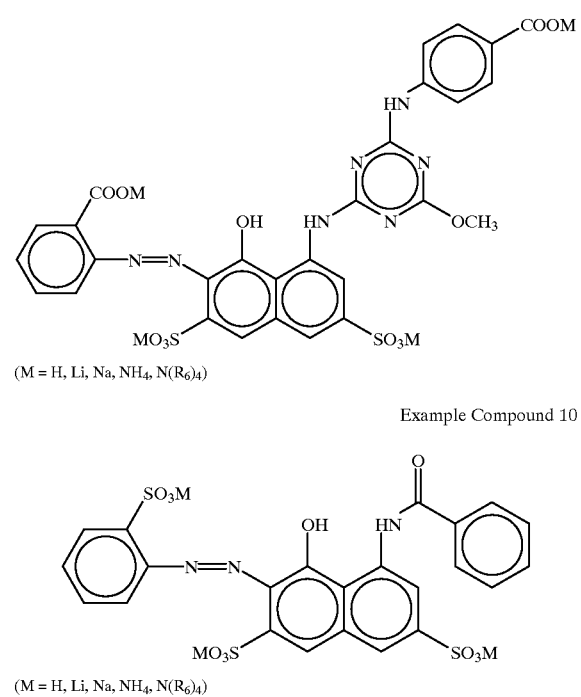

(M = H, Li, Na, NH$_4$, N(R$_6$)$_4$)

Example Compound 12

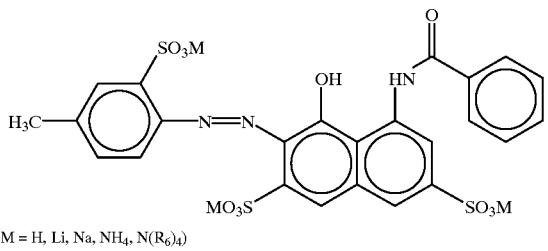

(M = H, Li, Na, NH$_4$, N(R$_6$)$_4$)

Example Compound 13

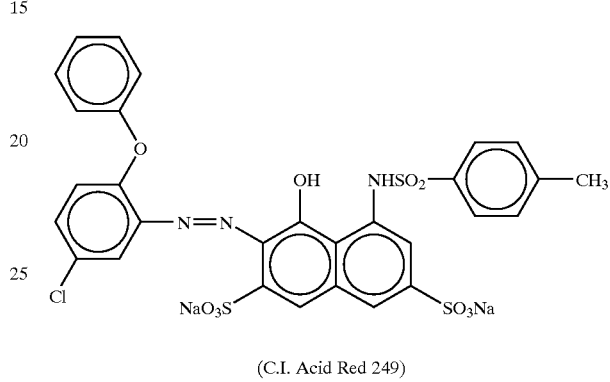

(C.I. Acid Red 249)

Regarding the weight ratio of the first coloring material represented by the general formula 1 and the second coloring material represented by the general formula 2 included in an ink according to the present embodiment, in consideration of the effects of exhibiting sharp color tone, sufficient image density, and further superior light resistance due to the combination of the first coloring material and the second coloring material, and the use of the mixture thereof, the ratio of the first coloring material represented by the general formula 1 to the second coloring material represented by the general formula 2 is preferably within the range of 95:5 to 20:80 on a weight basis. The total content of the coloring materials in the ink is within the range of 0.1% to 15.0% by weight relative to the entirety of the ink, and, in particular, preferably is within the range of 0.5% to 5.0% by weight.

Aqueous Medium

The water-soluble organic solvent contained in the water-based medium used in the present invention is not specifically limited as long as the solvent is water-soluble, so that alcohols, polyhydric alcohols, polyglycols, glycol ethers, nitrogen-containing polar solvents, sulfur-containing polar solvents, etc., can be mentioned. Regarding these water-soluble organic solvents, in consideration of the maintenance of the moisture retention of the ink, the improvement of the solubility of the coloring material, and the effective penetration of the ink into the recording paper, the content of the water-soluble organic solvent is preferably within the range of 1% to 40% by weight relative to the entirety of the ink, more preferably, within the range of 3% to 30% by weight. Furthermore, the content of the water in the ink is preferably within the range of 30% to 95% by weight in order that the solubility of the dye as the coloring material into the water is excellent, the viscosity is appropriate for stable ejection of the ink, and plugging of the nozzle tip is prevented from occurring.

pH

Regarding the ink according to the present invention, when at least one of the coloring materials includes at least one carboxyl group or salt thereof in the molecule, from the viewpoint of prevention of a decrease in the solubility of the coloring material into the water, prevention of plugging of the nozzle tip, and long term preservation of the ink, the pH of the ink is preferably kept within the range from the neutral area to the alkaline area, and specifically, is preferably kept within the range of 7.0 to 11.0. When coloring materials not including a carboxyl group or a salt thereof in their molecules are used, since the solubility of the coloring material is not likely to depend on the pH, the pH of the ink may be within the range of 4.0 to 11.0.

Additives

In order to maintain the moisture retention of the ink, in the present invention, if necessary, a moisture-retentive solid matter, for example, urea, urea derivatives, or trimethylolpropane, may be used as a component of the ink. In general, the content of the moisture-retentive solid matter, for example, urea, urea derivatives, and trimethylolpropane, in the ink is preferably within the range of 0.1% to 20.0% by weight relative to the entirety of the ink, and more preferably, is within the range of 3.0% to 10.0% by weight. In the ink according to the present invention, if necessary, various additives other than the aforementioned components, for example, surfactants, pH regulators, rust inhibitors, preservatives, fungicides, antioxidants, reduction inhibitors, vaporization accelerators, chelating agents and water-soluble polymers, may be contained.

Second Embodiment

As an ink according to the second embodiment of the present invention, ink corresponding to the ink according to the first embodiment in which the azo-based second coloring material represented by the aforementioned general formula 2 is replaced by a xanthene dye having a magenta color and having superior color tone, for example, C.I. Acid Red 52 or C.I. Acid Red 289 represented by the following structural formulae, can be mentioned. By using the ink according to the second embodiment of the present invention, in which the aforementioned dyes having a magenta color are combined with a dye used as the first coloring material represented by the aforementioned general formula 1 and having an anthrapyridone skeleton, the resulting image has a lightfastness exceeding, by a large degree, the lightfastness predicted based on an image produced using an ink containing only the aforementioned xanthene dye as the coloring material.

Regarding the weight ratio of the first coloring material represented by the general formula 1 and the aforementioned xanthene-based coloring material in the ink according to the second embodiment of the present invention, in consideration of the effects of exhibiting sharp color tone, high image density, and superior light resistance due to the combination of the first coloring material represented by the general formula 1 and the aforementioned xanthene-based coloring material, the ratio of the first coloring material represented by the general formula 1 to the xanthene-based coloring material is preferably within the range of 95:5 to 20:80 on a weight basis.

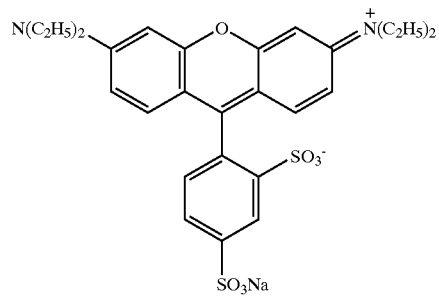

C.I. Acid Red 52

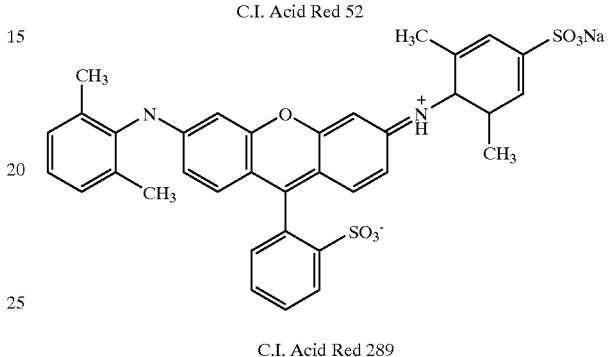

C.I. Acid Red 289

Third Embodiment

As an ink according to the third embodiment of the present invention, ink corresponding to the ink according to the first embodiment in which at least one xanthene dye, having a magenta color and having superior color tone, selected from the aforementioned C.I. Acid Red 52 and C.I. Acid Red 289 is further contained as the third coloring material can be mentioned. By adding these dyes, an image having more excellent color tone can be produced. By using the ink in which the aforementioned xanthene dye is combined with the first and the second coloring materials represented by the aforementioned general formulae 1 and 2, respectively, the resulting image has a lightfastness exceeding, by a large degree, the lightfastness predicted based on an image produced using an ink containing at least one of the xanthene dye and the azo dye as the coloring material. The aforementioned effect is far beyond what can be predicted based on the effects of inks each using just one of the coloring materials alone. In particular, an image using the ink according to the embodiment in which C.I. Acid Red 289 is contained as the third coloring material has superior color tone. The ink according to the third embodiment, which can produce an image having an excellent color tone and a high degree of lightfastness, can be very appropriately used as, for example, the magenta ink for an ink-jet printer which can print an image having a high quality comparable to a silver halide photograph that is required for the reproducibility of a delicate color tone.

Regarding the ratio of the amount A of the first coloring material represented by the general formula 1, the amount B of the second coloring material represented by the general formula 2, and the amount C of the aforementioned xanthene-based coloring material as the third coloring material in the ink according to the third embodiment of the present invention, in consideration of the effects of exhibiting very sharp color tone, high image density, and sufficient light resistance resulting from the combination of these coloring materials, the ratio of the amount of the first coloring material represented by the general formula 1 and the amount of the second coloring material represented by the general formula 2 and the aforementioned third coloring material, that is, A:(B+C), is preferably within the range of 95:5 to 20:80 on a weight basis.

The aforementioned inks according to the first to the third embodiments of the present invention are especially appropriately used for an ink-jet recording method in which the recording is performed by ejection of the droplets by the action of thermal energy, although it is needless to say that the inks can also be used for other ink-jet recording methods and general implements for writing.

Recording Apparatus, Ink Cartridge, Recording Unit, And Ink Set

As a recording apparatus suitable for recording using the aforementioned inks according to the first to the third embodiments of the present invention, an apparatus in which thermal energy responding to the recording signal is applied to the ink in the chamber of the recording head having an ink storage portion for storing the aforementioned ink, and the ink droplets are generated due to the energy, can be mentioned.

Figure 2:
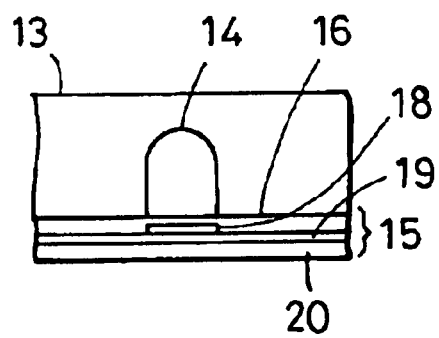
FIG. 2 is a horizontal sectional view of a head portion of an ink-jet recording apparatus taken along line 2—2 in FIG. 1.
Figure 3:
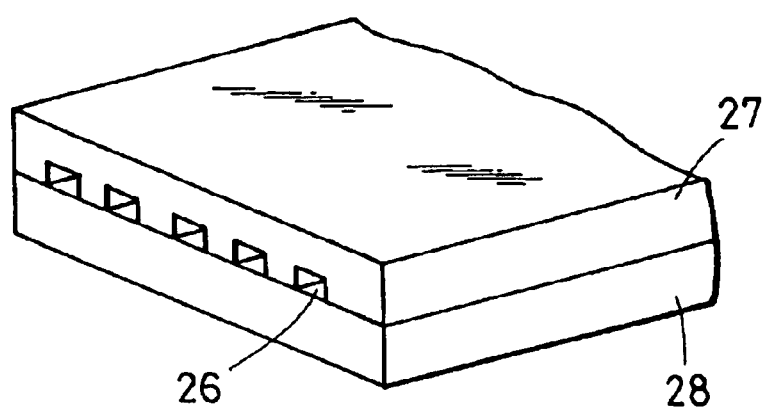
FIG. 3 is an external perspective view of a head portion of an ink-jet recording apparatus.

An embodiment of a configuration of the recording head as the primary part thereof is shown in FIGS. 1 to 3.

A head 13 is produced by adhering a board, made of, for example, glass, ceramic, or plastic, having a groove 14 for passing the ink and a heating head 15 including a heating resistor used for thermal recording. Although a head is shown in the drawings, the present invention is not limited to this configuration. The heating head 15 is composed of a protection film 16 formed of silicon oxide, etc., aluminum electrodes 17-1 and 17-2, a heating resistor layer 18 formed of nichrome, etc., a thermal storage layer 19, and a heat-dissipating substrate 20 made of alumina, etc. An orifice (fine pore) 22 is filled with the ink 21, and a meniscus 23 is formed due to pressure. When an electric pulse signal is applied to the electrodes 17-1 and 17-2 of the to aforementioned head 13, the region n (heater) in the heating element substrate 15 is rapidly heated, and bubbles are generated in the ink 21 in contact with the surface thereof, so that the meniscus 23 is discharged, the ink 21 is discharged through a nozzle 14 of the head, and the ink droplets 24 formed at an ejection orifice 22 are ejected toward a recording material 25. FIG. 3 shows an external view of an embodiment of a multihead in which many heads shown in FIG. 1 are arranged. This multihead is produced with adhesion of a glass board 27 including a multinozzle 26 and a heating head 28 similar to that illustrated in FIG. 1.

Figure 4:
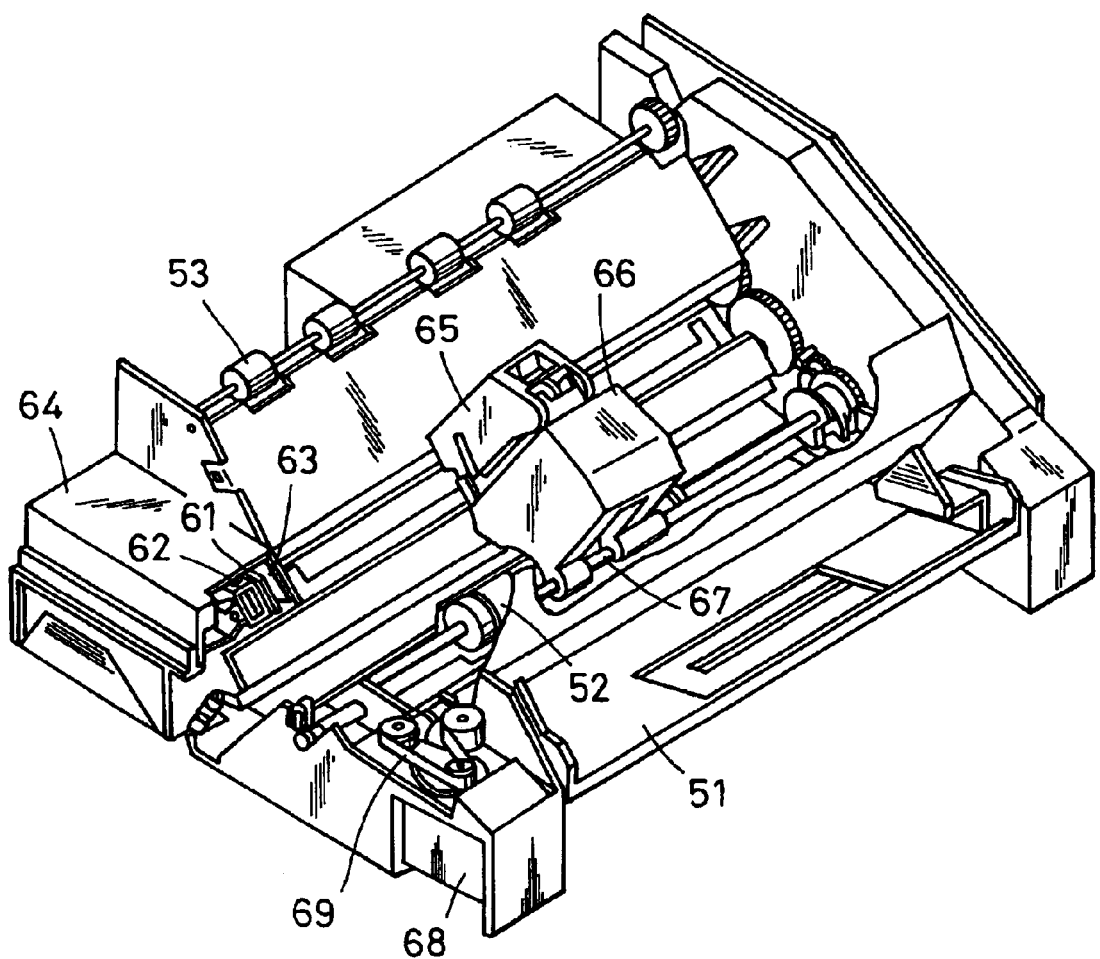
FIG. 4 is a perspective view of an embodiment of an ink-jet recording apparatus.

FIG. 4 shows an embodiment of an ink-jet recording apparatus that incorporates this head. In FIG. 4, an end of a blade 61 as a wiping member is held by a blade-holding member so as to form a fixed end in the form of a cantilever. The blade 61 is deployed at a position adjacent to a recording region for the recording head, and in the embodiment as shown in FIG. 4, the blade 61 is held protruding into the path of the movement of the recording head. A cap 62 is deployed at the home position adjacent to the blade 61. The cap 62 moves in the direction perpendicular to the direction of the movement of the recording head and contacts the ejection face so as to perform capping. Ink absorbent 63 as shown in FIG. 4 is deployed adjacent to the blade 61, and is held protruding 110 into the path of the movement of the recording head in a manner similar to that of the blade 61.

An ejection recovery portion 64 is composed of the aforementioned blade 61, cap 62, and absorbent 63, and water, dust, and the like on the ink ejection outlet face are removed by the blade 61 and the absorbent 63.

The recording head 65 has an ejection energy generation device and ejects the ink toward the recording material facing an ejection outlet face provided with an ejection outlet so as to perform the recording. A carriage 66 has a recording head 65 mounted on it so as to carry the recording head 65. The carriage 66 slidably engages a guide shaft 67 and a part of the carriage 66 connects with a belt 69 driven with a motor 68, although not shown in the drawing. Accompanying this, the carriage 66 can move along the guide shaft 67, and therefore, the recording head 65 can move to the recording region and the region adjacent thereto.

A feeder 51 inserts the recording material. A feed roller 52 is driven with a motor, although not shown in the drawing. According to this configuration, the recording material is fed to a position facing the ejection outlet face of the recording head, and is discharged to a discharge portion provided with a discharge roller 53 during the recording.

Regarding the aforementioned configuration, when the recording head returns to the home position in accordance with the completion of the recording, etc., the blade 61 protrudes into the path of the movement of the recording head 65, while the cap 62 in the head recovery portion 64 recedes from the path of the movement. As a consequence, the ejection outlet face of the recording head 65 is wiped. When the cap 62 contacts the ejection outlet face of the recording head 65 in order to perform capping, the cap 62 moves so as to protrude into the path of the movement of the recording head 65.

When the recording head 65 moves from the home position to the recording start position, the cap 62 and the blade 61 are located at the same position as that in the aforementioned wiping. As a consequence, the ejection outlet face of the recording head 65 is also wiped during this movement. The recording head moves to the home position at the time of the completion of the recording and the ejection recovery. In addition to this, when the recording head moves between recording regions for recording, the recording head moves to the home position adjacent to the recording region at predetermined intervals so that the aforementioned wiping is also performed accompanying this movement.

Figure 5:
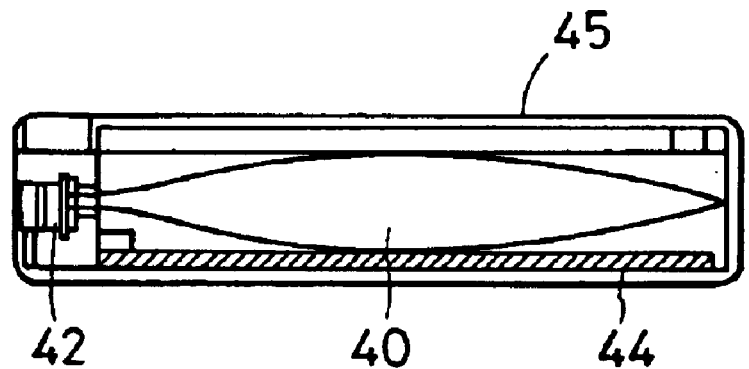
FIG. 5 is a vertical sectional view of an ink cartridge.

FIG. 5 shows a sectional view of an embodiment of an ink cartridge 45 storing the ink to be supplied to the head through an ink supply member, for example, a tube. Herein, the ink storage portion 40 storing the supply of ink is, for example, an ink bag having a rubber stopper 42 at the end. The ink in the ink bag 40 can be fed to the head by a needle, although not shown in the drawing, inserted into the stopper 42. Ink absorbent 44 receives the waste ink.

Figure 6:
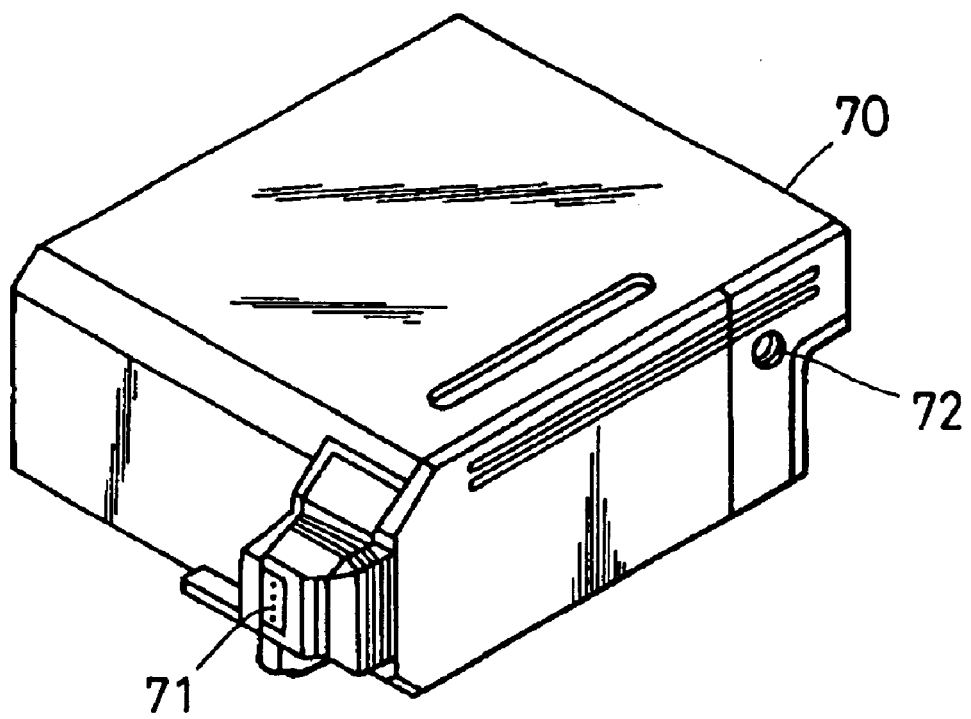
FIG. 6 is a perspective view of a recording unit.

The ink-jet recording apparatus used in the present invention is not limited to the aforementioned ink-jet recording apparatus in which the head and the ink cartridge are separated, and an ink-jet recording apparatus in which the head and the ink cartridge are integrated, as shown in FIG. 6, can also be preferably used.

In FIG. 6, an ink storage portion storing the ink, for example, an ink absorbent, is stored in a recording unit 70, and the ink in the ink absorbent is ejected as ink droplets from a head portion 71 including a plurality of orifices. The inside of the recording unit is communicated with air through a ventilation hole 72. This recording unit 70 is used instead of the recording head 65 as shown in FIG. 4, and can be freely attached to or detached from the carriage 66.

Other specific embodiments of the recording apparatus and the recording head preferably used for the present invention will be explained below.

Figure 7:
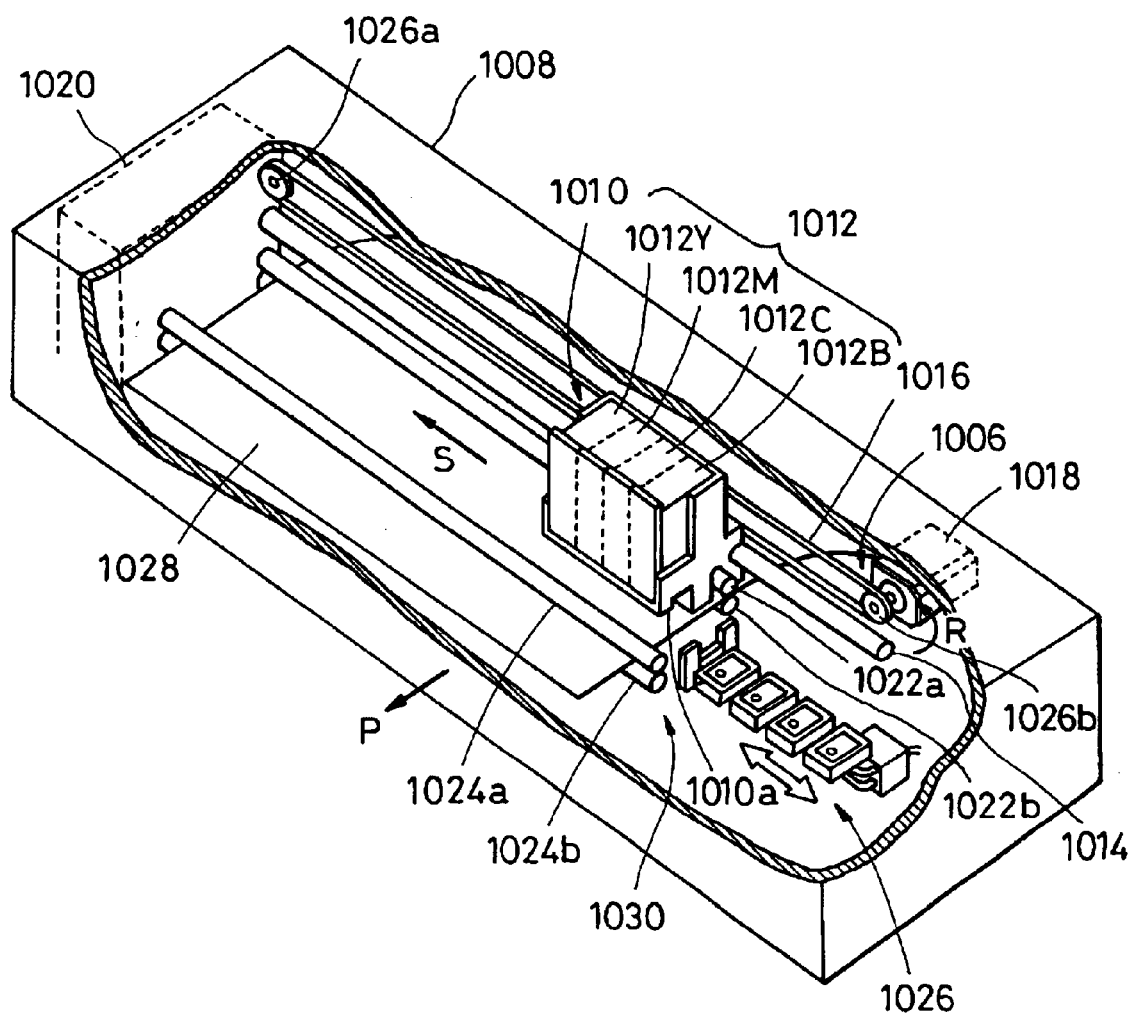
FIG. 7 is a schematic perspective view of a key portion of an ink-jet printer on which a liquid ejection head can be mounted.

FIG. 7 is a schematic perspective view of a liquid ejection head suitable for the present invention as a liquid ejection head according to the ejection method in which bubbles are communicated with air at the time of the ejection, and the primary part of an embodiment of an ink-jet printer as a liquid ejection apparatus using the aforementioned liquid ejection head. The ink-jet printer, as shown in FIG. 7, is composed of a conveyer 1030 for intermittently conveying the paper 1028 as the recording material, set along the longitudinal direction, in the direction indicated by the arrow P as shown in FIG. 7, a recording portion 1010 reciprocated along a guide shaft 1014 in the direction nearly parallel to the direction S nearly orthogonal to the direction P of the conveyance of the paper 1028, and a movement drive part 1006 as a drive device for reciprocating the recording portion 1010 in a casing 1008.

The aforementioned conveyer 1030 is provided with a pair of roller units 1022a and 1022b and a pair of roller units 1024a and 1024b, which are nearly parallel-opposed to each other, and a drive portion 1020 for driving each of these roller units. According to the aforementioned configuration, when the drive portion 1020 of the conveyer 1030 is actuated, the paper 1028 is held between each of the roller units 1022a and 1022b, and the roller units 1024a and 1024b, and is intermittently conveyed in the direction indicated by the arrow P as shown in FIG. 7.

The movement drive portion 1006 is composed of a belt 1016 looped over pulleys 1026a and 1026b deployed on revolving shafts opposed to each other with a predetermined distance therebetween, and a motor 1018 for driving, in the forward and reverse directions, the belt 1016 which is arranged nearly parallel to the roller units 1022a and 1022b and connected with a carriage member 1010a of the recording portion 1010.

When the motor 1018 is actuated and the belt 1016 is rotated in the direction indicated by the arrow R as shown in FIG. 7, the carriage member 1010a of the recording portion 1010 is moved in the direction indicated by the arrow S as shown in FIG. 7 by a predetermined moving distance. When the motor 1018 is actuated and the belt 1016 is rotated in the direction reverse to the direction indicated by the arrow R as shown in FIG. 7, the carriage member 1010a of the recording portion 1010 is moved in the direction reverse to the direction indicated by the arrow S as shown in FIG. 7 by a predetermined moving distance. At one end of the movement drive portion 1006, a recovery unit 1026 for performing the ejection recovery treatment of the recording portion 1010 is deployed at the home position of the carriage member 1010a facing the ink ejection outlets of the recording portion 1010.

In the recording portion 1010, ink-jet cartridges (hereafter may be abbreviated as cartridge 1012) 1012Y, 1012M, 1012C, and 1012B are deployed for each of the colors, for example, yellow, magenta, cyan, and black so as to freely attach to or detach from the carriage member 1010a.

Figure 8:
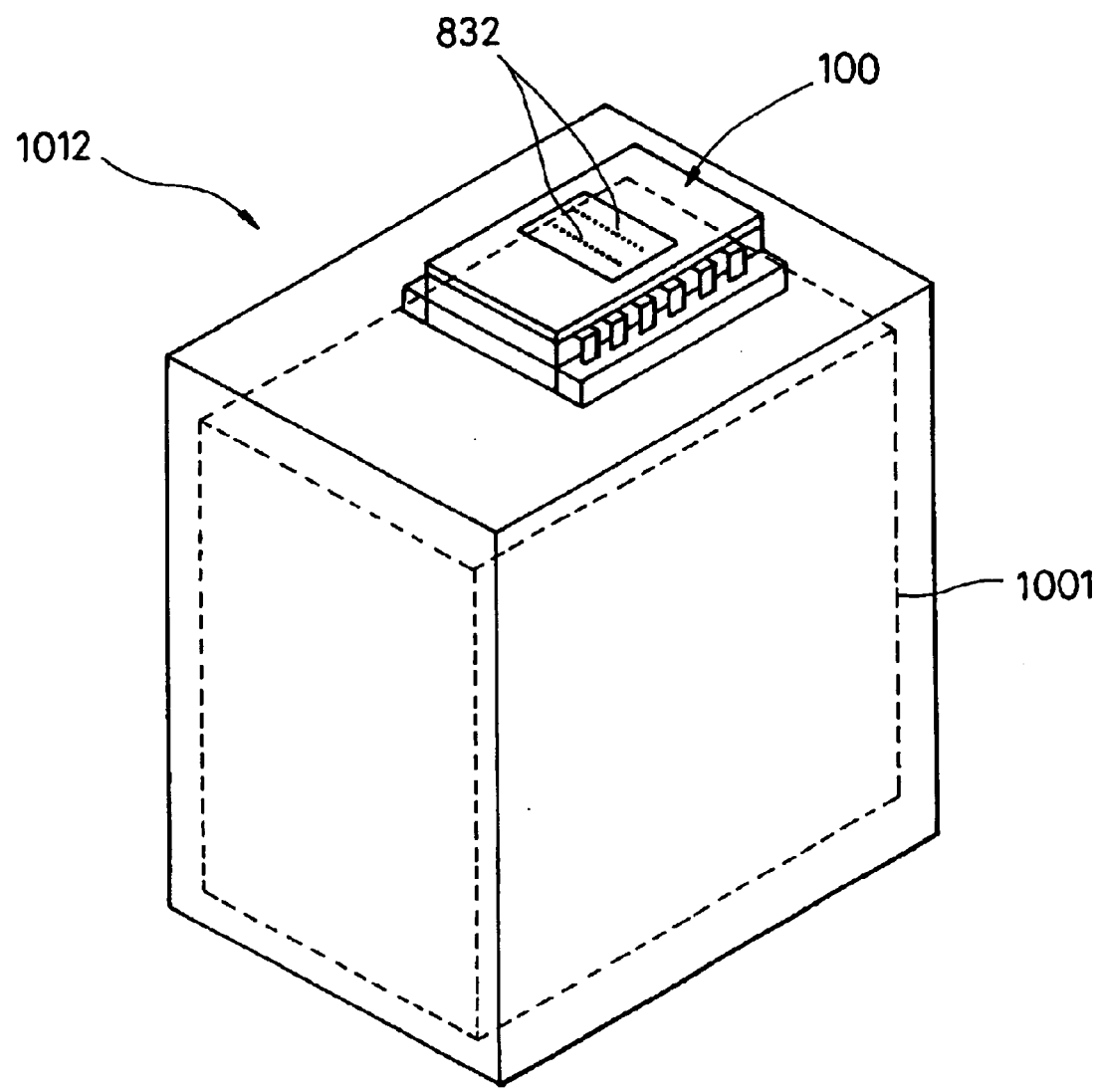
FIG. 8 is a schematic perspective view of an embodiment of an ink-jet cartridge provided with a liquid ejection head.
Figure 9:
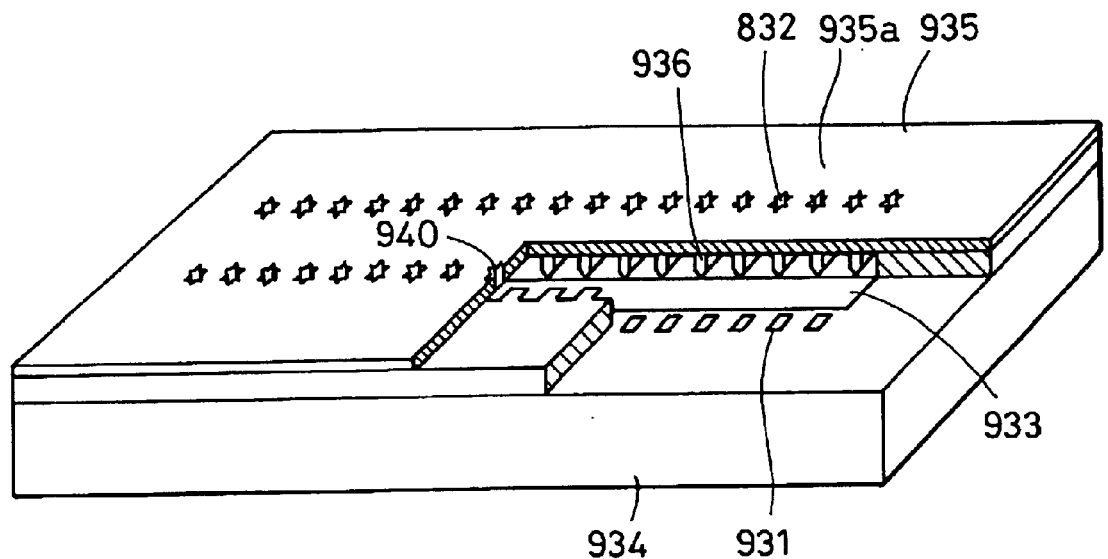
FIG. 9 is a schematic perspective view showing a key portion of a liquid ejection head.

FIG. 8 shows an embodiment of the ink-jet cartridge which can be mounted on the aforementioned ink-jet recording apparatus. The ink-jet cartridge 1012 according to the present embodiment is a serial type cartridge and the primary part thereof is composed of an ink-jet recording head 100 and a liquid tank 1001 for storing the liquid, for example, the ink. The ink-jet recording head 100 is provided with many ejection outlets 832, and the liquid, for example, the ink, is supplied from the liquid tank 1001 to a common liquid chamber, as shown in FIG. 9, of the ink-jet recording head 100 through a liquid feed path, although not shown in the drawing. The cartridge 1012 as shown in FIG. 8 is composed of the ink-jet recording head 100 and the liquid tank 1001, which are integrated, and the liquid tank 1001 can be replenished with the liquid, if necessary. Regarding the liquid tank 1001, a configuration in which the liquid tank 1001 is exchangeably connected may be adopted.

Specific embodiments of the liquid ejection head, which can be mounted on the ink-jet printer having the aforementioned configuration, will be explained below in further detail.

Figure 10:
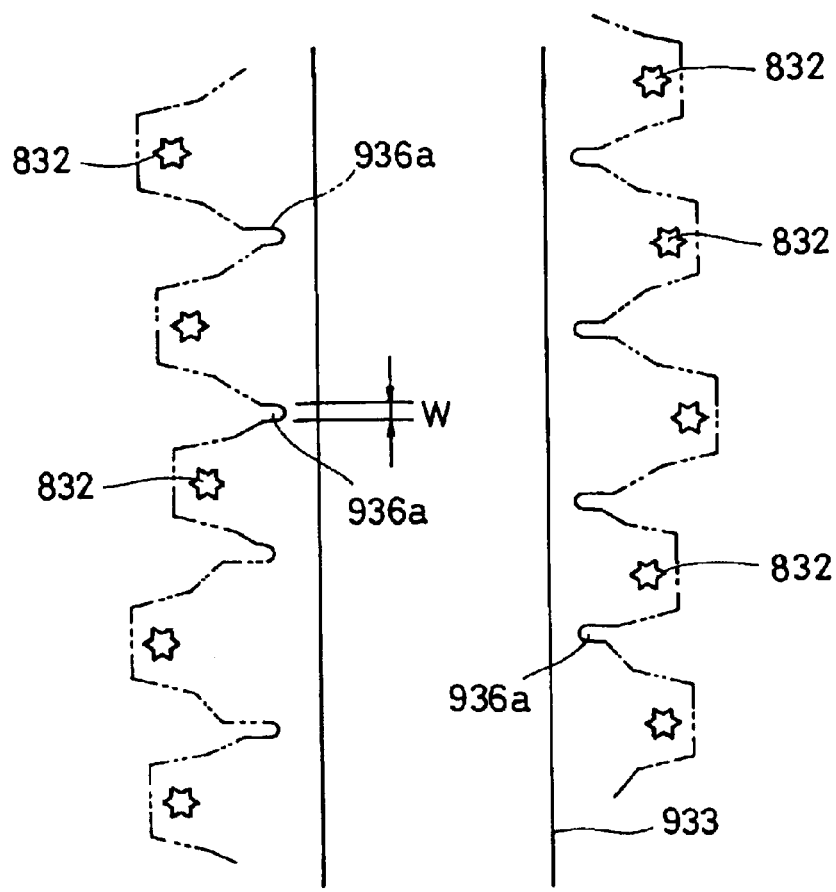
FIG. 10 is a conceptual diagram showing a portion of a liquid ejection head.
Figure 11:
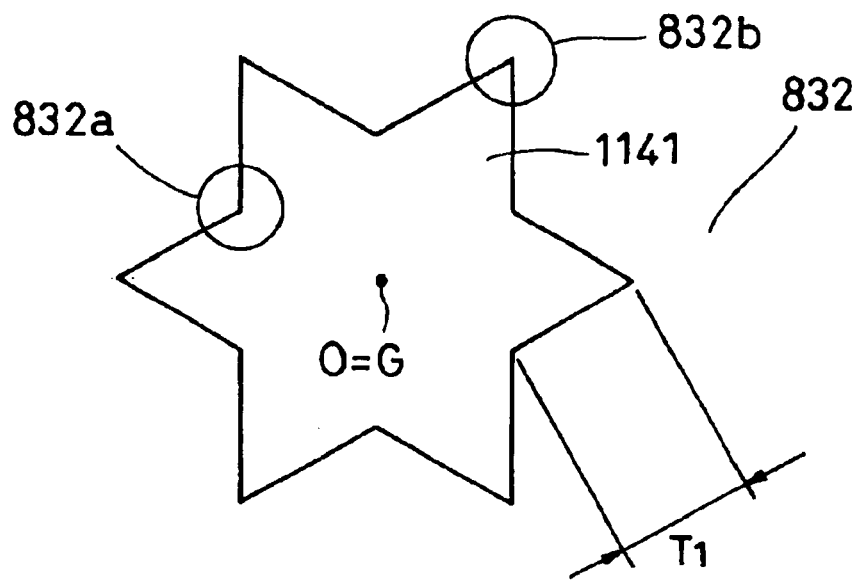
FIG. 11 is an enlarged diagram of an ejection outlet shown in FIG. 10.
Figure 12:
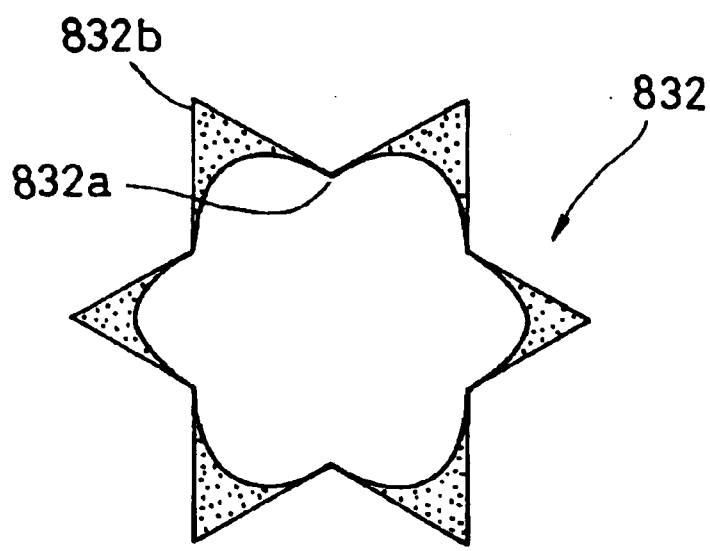
FIG. 12 is a schematic diagram illustrating adhesion of the ink to the ejection outlet shown in FIG. 11.

FIG. 9 is a schematic perspective view showing a key portion of a liquid ejection head according to a basic embodiment of the present invention. FIGS. 10 to 12 are views showing the shape of the ejection outlets of the liquid ejection head as shown in FIG. 9. Herein, electrical wiring, etc., for driving the electrothermal transducer element are omitted.

In the liquid ejection head according to the present embodiment, for example, as shown in FIG. 9, a substrate 934 made of glass, ceramic, plastic, metal, etc., is used. The material of the aforementioned substrate is not essential and is not specifically limited as long as the substrate functions as a part of the members constituting the flow path, and can function as an ink ejection energy generation element and can function as a support member for the material layer forming the liquid flow path and the ejection outlet as described below. In the present embodiment, explanations are made of the case in which a silicon (Si) substrate (wafer) is used. The ejection outlet can be formed using a laser beam. In addition to this, the ejection outlet may be formed, for example, with an exposure apparatus such as MPA (Mirror Projection Aligner) using an orifice plate (ejection outlet plate) 935, described below, as a photosensitive resin.

In FIG. 9, a substrate 934 is provided with an it electrothermal transducer element (hereafter may be described as heater) 931 and an ink supply hole 933, which is a long groove type penetration hole, as a common liquid chamber portion. Along both sides in the longitudinal direction of the ink supply hole 933, the heaters 931 as the energy generation device are staggered in one row on each side, for example, at intervals of 300 dpi between adjacent electrothermal transducer elements (heaters). Ink flow path walls 936 for forming the ink flow path are deployed on the substrate 934. On the ink flow path walls 936, an ejection outlet plate 935 including ejection outlets 832 is deployed.

In FIG. 9, the ink flow path walls 936 and the ejection outlet plate 935 are shown as different members, although the ink flow path walls 936 and the ejection outlet plate 935 can also be formed as the same member at the same time by forming the ink flow path walls 936 on the substrate 934 using, for example, a spin coat method. In the present embodiment, the upper side of the ejection outlet face 935a is treated to be water-repellent.

Figure 13:
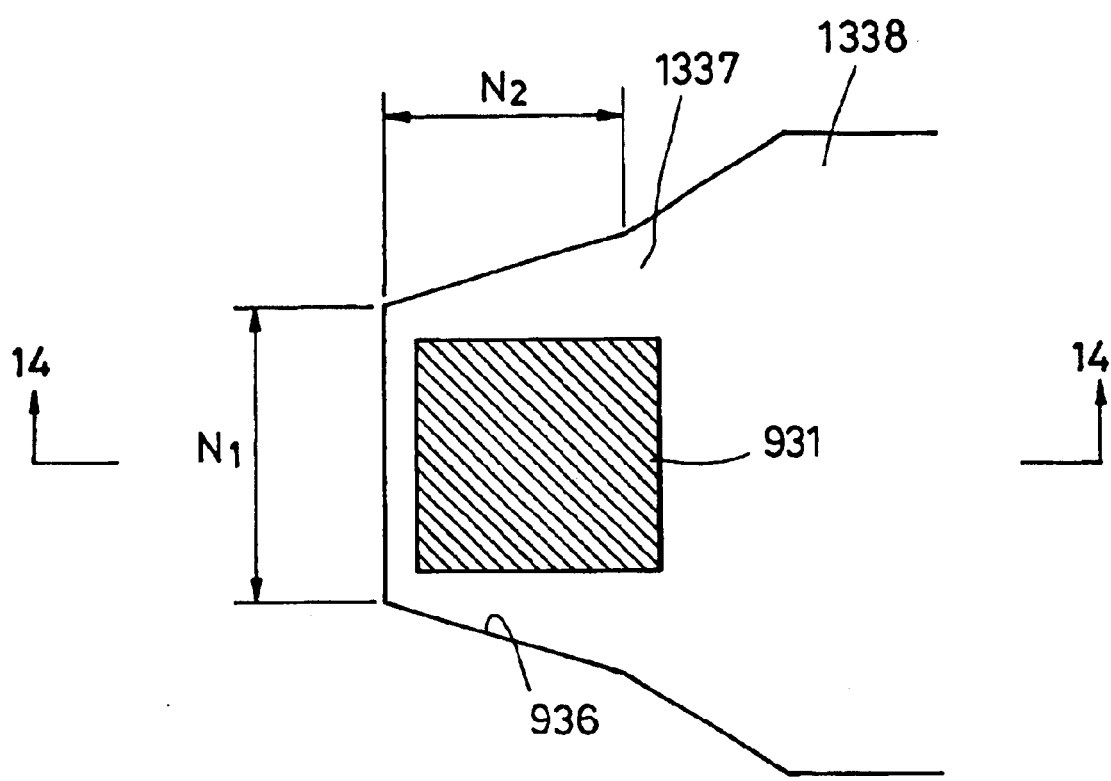
FIG. 13 is a schematic diagram of a primary part of the liquid ejection head shown in FIG. 10.

In the present embodiment, a serial type head, which performs recording while scanning in the aforementioned direction indicated by the arrow S in FIG. 7, is used for recording at, for example, 1200 dpi. The driving frequency is 10 kHz and one ejection outlet performs ejections at every 100 μs when in the shortest time intervals. Regarding the practical dimensions of the head, for example, as shown in FIG. 10, partitions 936a for separating the liquids of adjacent nozzles have a width w of 14 μm. As shown in FIG. 13, liquid flow path 1338 has a bubbling chamber 1337 formed with the ink flow path wall 936 that has a width $N_1$ of 33 μm, and a length $N_2$ of 35 μm. The heater 931 has dimensions of 30 μm by 30 μm, the heater resistance is 53Ω, and the driving voltage is 10.3 V. The ink flow path wall 936 and the partitions 936a each having the height of 12 μm can be used, and an ejection outlet plate 935 having a thickness of 11 μm can be used.

Among the sections of an ejection outlet 940 deployed in the ejection outlet plate 935 including the ejection outlets 832 as shown in FIG. 9, a section cut in the direction orthogonal to the direction of the ink ejection (the direction of the thickness of the orifice plate 935), is nearly in the shape of a star as shown in FIG. 11, which is approximately composed of six convex portions 832a having a obtuse angle and six concave portions 832b having an acute angle, so that the convex portion 832a and the concave portion 832b are alternately arranged. That is, as shown in FIG. 11, six grooves 1141 are formed in the direction of the thickness of the orifice plate (the direction of the liquid ejection) as shown in FIG. 9, in which the concave portion 832b makes the distal portion as a region located far from the center O of the ejection outlet, and the convex portion 832a adjacent thereto makes the proximal portion as a region near to the center O of the ejection outlet.

In the present embodiment, regarding the ejection outlet 940, for example, a section cut in the direction orthogonal to the direction of the thickness of the orifice plate has a shape in which two equilateral triangles having a side length of 27 $\mu$m are overlapped while one of them is rotated by 60 degrees, so that the length $T_1$ as shown in FIG. 11 is 8 $\mu$m. The angle of every concave portion 832b is 60 degrees, and the angle of every convex portion 832a is 120 degrees. Therefore, the center O of the ejection outlet and the median point G of the polygon formed by connecting the centers of each of the adjacent grooves, that is, the centers (median points) of the figure formed by connecting the distal point of the groove and the two proximal points adjacent to the distal point, are identical. In the present embodiment, the area of the opening of the ejection outlet 832 is 400 $\mu$m$^2$, and the area of the opening of the groove, that is, the area of the figure formed by connecting the distal point of the groove and the two proximal points adjacent to the distal point, is about 33 $\mu$m$^2$ per groove. FIG. 12 is a schematic diagram illustrating adhesion status of the ink to the ejection outlet shown in FIG. 11.

Figure 14:
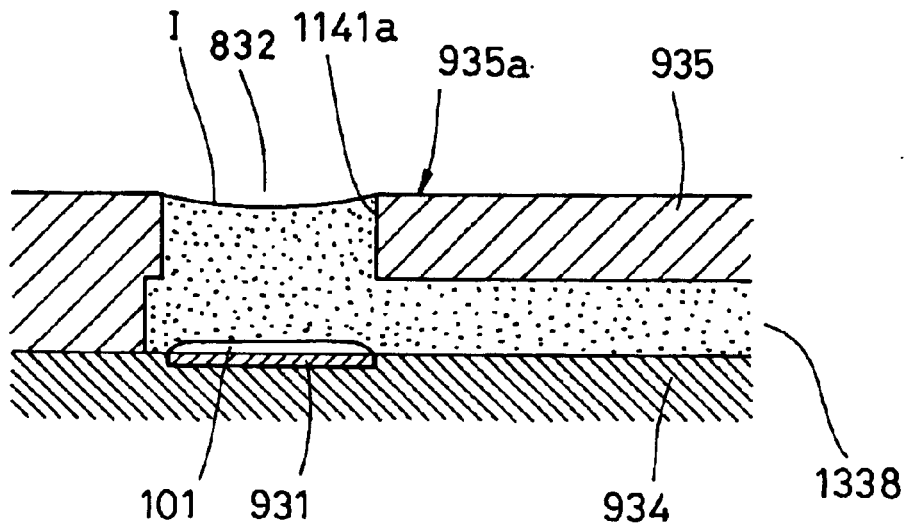
FIG. 14 is a schematic sectional view of the section indicated by arrows 14—14 shown in FIG. 13, for illustrating the actions of a liquid varying with time during the ejection of the liquid at a liquid ejection head, together with FIGS. 15 to 21.
Figure 15:
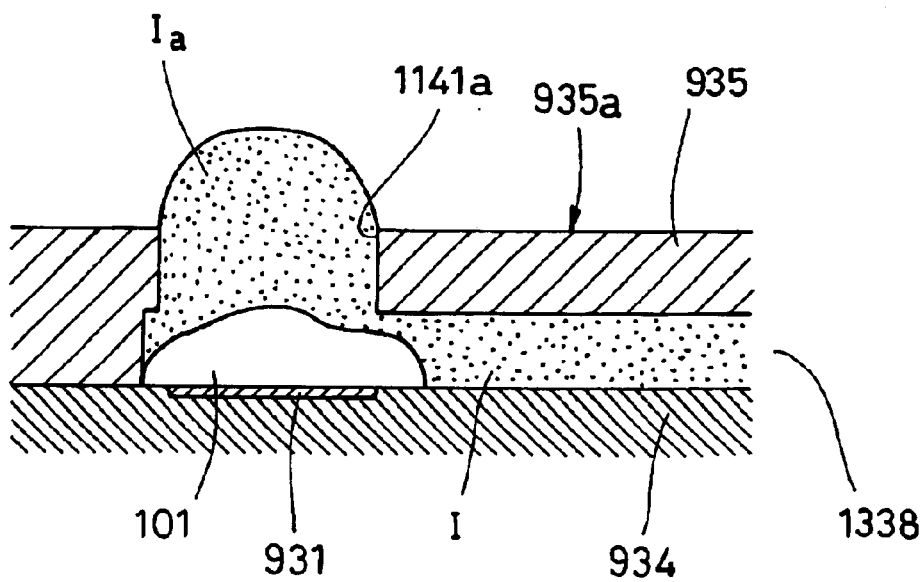
FIG. 15 is a schematic sectional view of the section indicated by arrows 14—14 shown in FIG. 13, for illustrating the actions of a liquid varying with time during the ejection of the liquid at a liquid ejection head, together with FIGS. 14, and 16 to 21.
Figure 16:
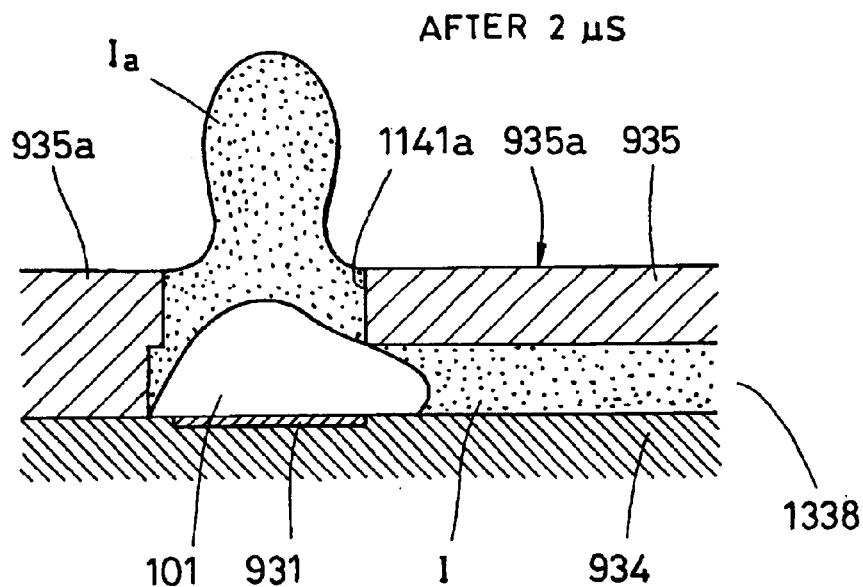
FIG. 16 is a schematic sectional view of the section indicated by arrows 14—14 shown in FIG. 13, for illustrating the actions of a liquid varying with time during the ejection of the liquid at a liquid ejection head, together with FIGS. 14, 15, and 17 to 21.
Figure 17:
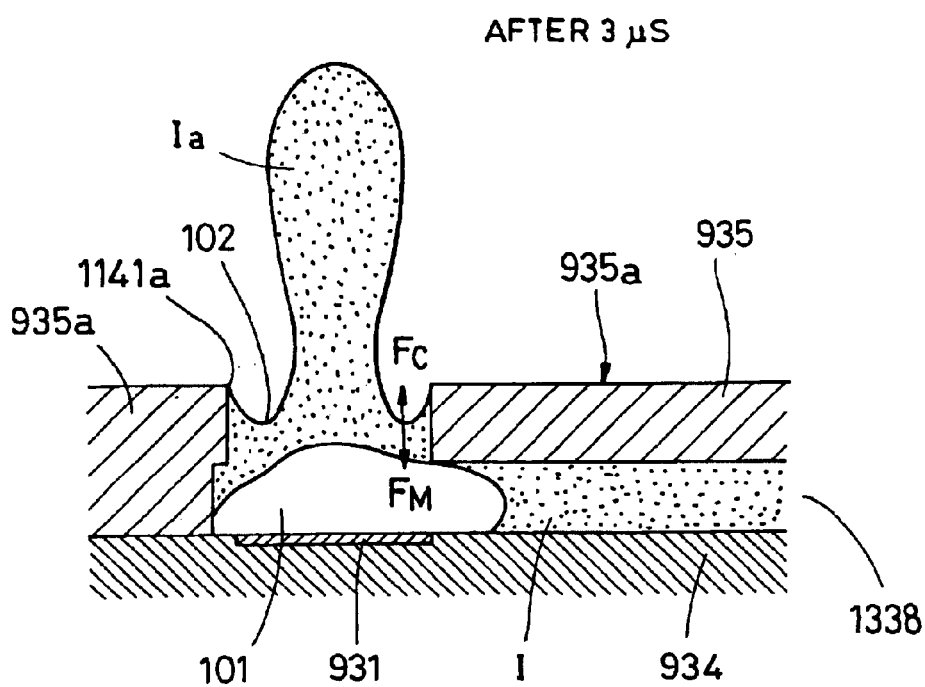
FIG. 17 is a schematic sectional view of the section indicated by arrows 14—14 shown in FIG. 13, for illustrating the actions of a liquid varying with time during the ejection of the liquid at a liquid ejection head, together with FIGS. 14 to 16, and 18 to 21.
Figure 18:
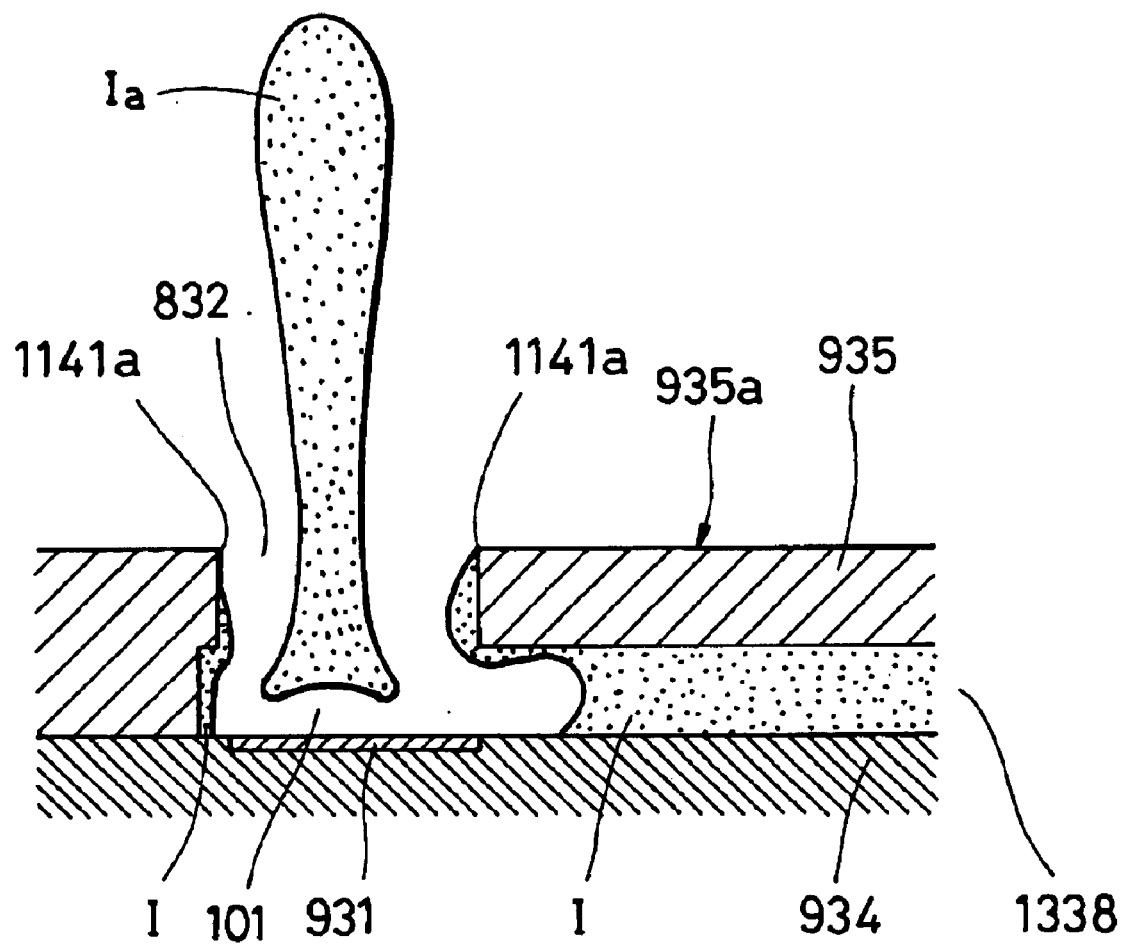
FIG. 18 is a schematic sectional view of the section indicated by arrows 14—14 shown in FIG. 13, for illustrating the actions of a liquid varying with time during the ejection of the liquid at a liquid ejection head, together with FIGS. 14 to 17, and 19 to 21.
Figure 19:
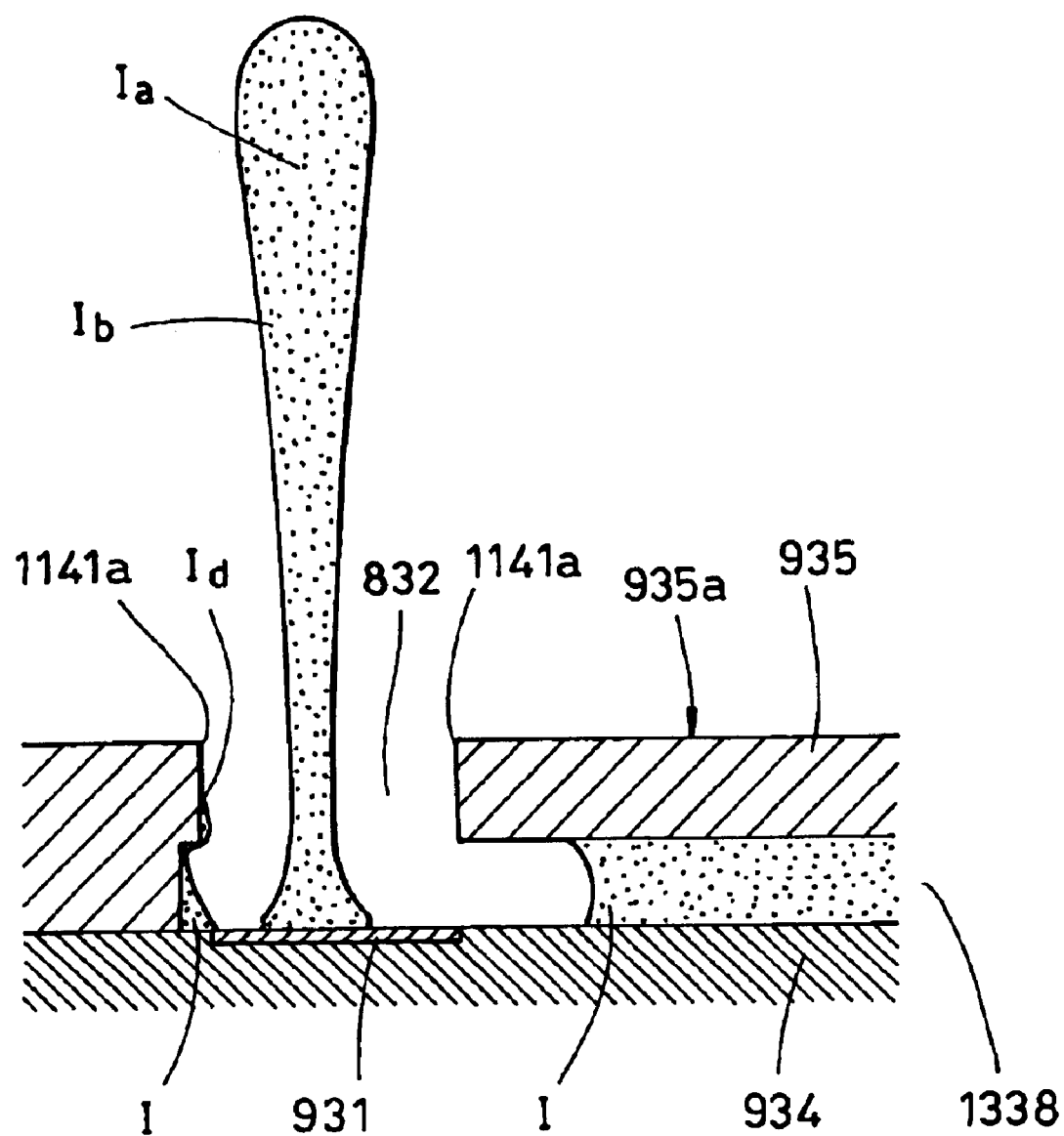
FIG. 19 is a schematic sectional view of the section indicated by arrows 14—14 shown in FIG. 13, for illustrating the actions of a liquid varying with time during the ejection of the liquid at a liquid ejection head, together with FIGS. 14 to 18, 20, and 21.
Figure 20:
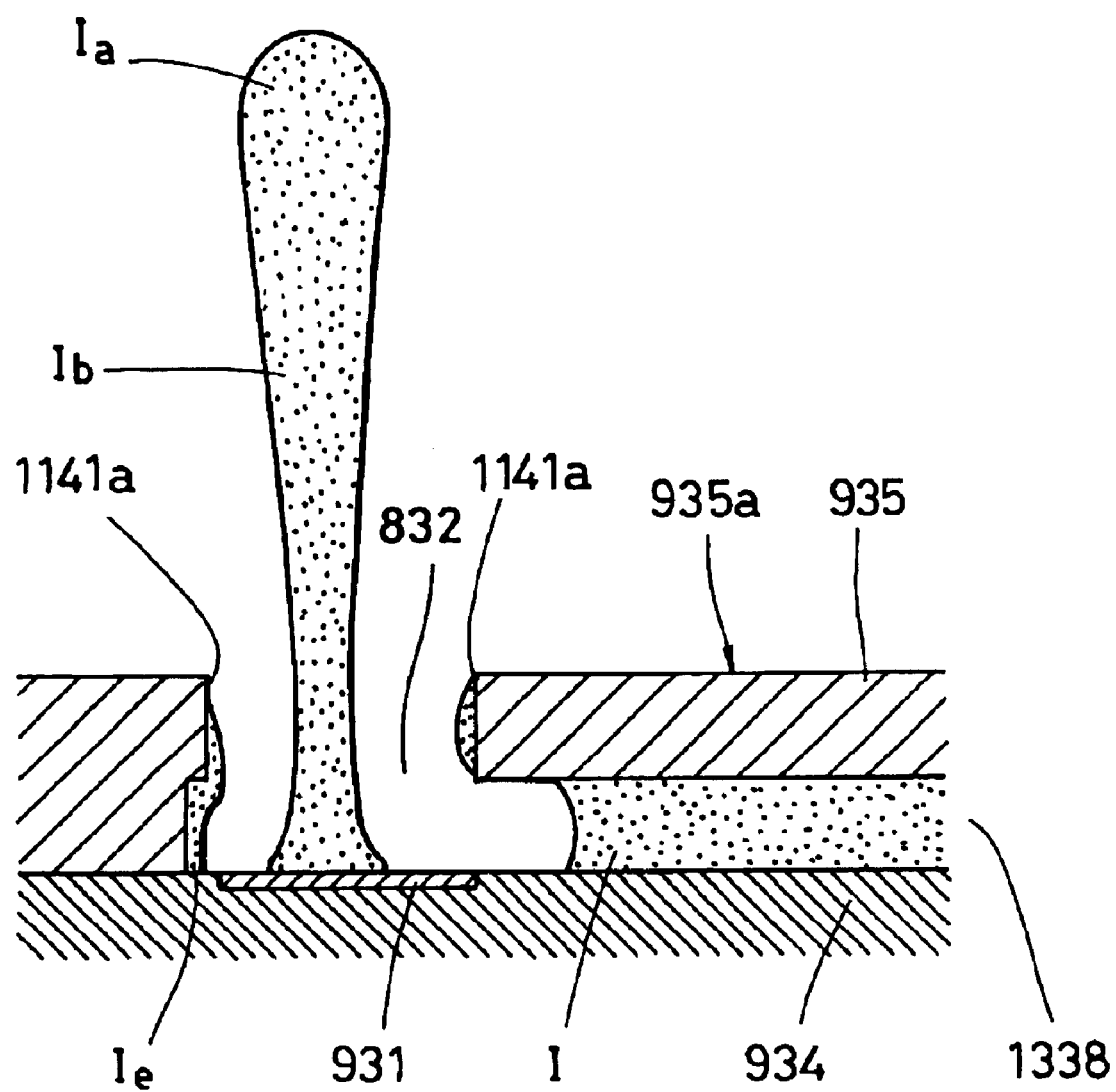
FIG. 20 is a schematic sectional view of the section indicated by arrows 14—14 shown in FIG. 13, for illustrating the actions of a liquid varying with time during the ejection of the liquid at a liquid ejection head, together with FIGS. 14 to 19, and 21.
Figure 21:
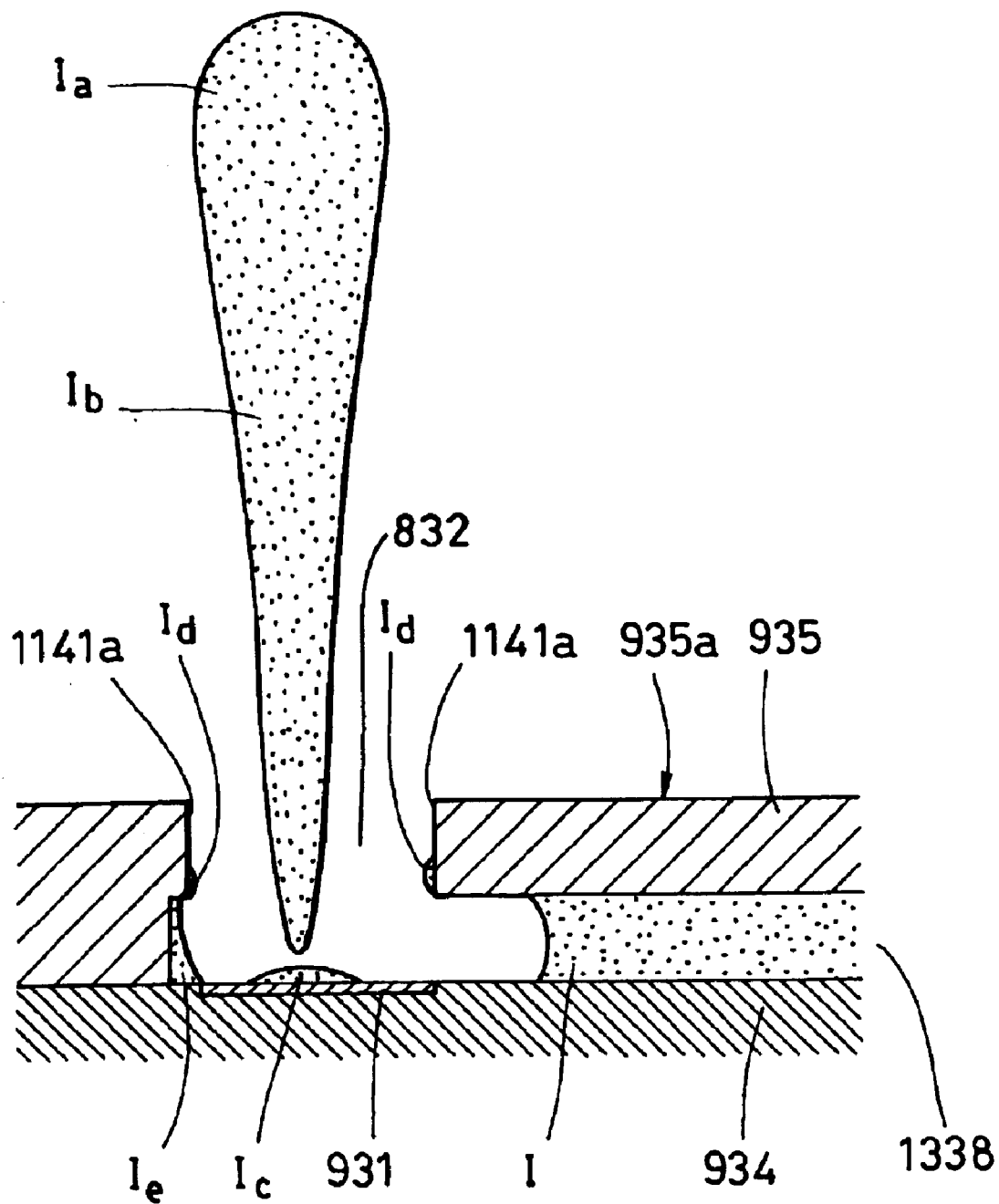
FIG. 21 is a schematic sectional view of the section indicated by arrows 14—14 shown in FIG. 13, for illustrating the actions of a liquid varying with time during the ejection of the liquid at a liquid ejection head, together with FIGS. 14 to 20.

Next, the liquid ejecting action of the ink-jet recording head having the aforementioned configuration will be explained with reference to FIG. 14 to FIG. 21. FIG. 14 to FIG. 21 are sectional views for illustrating the liquid ejecting action of the liquid ejection head as shown in FIG. 9 to FIG. 13, and are sectional views of the section 13—13 of the bubbling chamber 1337 shown in FIG. 13. In this section, the end in the direction of the thickness of the orifice plate of the ejection outlet 940 as shown in FIG. 9 corresponds to the top part 1141a of a groove 1141. FIG. 14 shows the status in which a film-like bubble is generated on a heater, and FIG. 15 to FIG. 21 show succeeding stages of the bubble varying with time. That is, FIG. 15 shows the status about 1 $\mu$s after the status as shown in FIG. 14, FIG. 16 shows the status about 2 $\mu$s after the status as shown in FIG. 14, FIG. 17 shows the status about 3 $\mu$s after the status as shown in FIG. 14, FIG. 18 shows the status about 4 $\mu$s after the status as shown in FIG. 14, FIG. 19 shows the status about 5 $\mu$s after the status as shown in FIG. 14, FIG. 20 shows the status about 6 $\mu$s after the status as shown in FIG. 14, and FIG. 21 shows the status about 7 $\mu$s after the status as shown in FIG. 14. Herein, in the following explanations, fall, fall down, etc., do not mean a fall in the direction of gravity, but mean movement in the direction of the electrothermal transducer element in spite of the direction in which the head is mounted.

As shown in FIG. 14, when a bubble 101 is generated in the liquid or ink, designated as I, in a liquid flow path 1338 on the heater 931 due to energization of the heater 931 based on the electric signal, etc., the bubble grows with a rapid increase in volume in about 2 $\mu$s, as shown in FIG. 15 and FIG. 16. The height of the bubble 101 at the maximum volume exceeds the level of the ejection outlet face 935a; at this time, the pressure of the bubble is decreased to about a half of atmospheric pressure to a twelfth or so of atmospheric pressure.

The volume of the bubble 101 begins to decrease from the maximum volume about 2 $\mu$s after the generation of the bubble, and at nearly the same time, a meniscus 102 begins to be formed. As shown in FIG. 17, this meniscus 102 also retreats, that is, falls, toward the heater 931 side. Herein, in the present embodiment, since a plurality of grooves 1141 are distributed in the ejection outlet part as described above, during the retreat of the meniscus 102, the capillary force acts in the direction $F_C$ reverse to the direction $F_M$ of the retreat of the meniscus 102. As a consequence, even if there is unevenness, to a certain degree, in the status of the bubble 101 for some reason, the shapes of the meniscus and the primary droplet (which hereafter may be described as liquid or ink) $I_a$ are corrected so as to be symmetrical with respect to the center of the ejection outlet during the retreat of the meniscus 102.

In the present embodiment, since the fall speed of the meniscus 102 is greater than the shrinkage speed of the bubble 101, as shown in FIG. 18, the bubble 101 communicates with the atmosphere in the neighborhood of the lower face of the ejection outlet 832 at about 4 $\mu$s after the generation of the bubble. At this time, the liquid (ink) in the neighborhood of the center axis of the ejection outlet 832 falls down toward the heater 931. This is because the liquid (ink) $I_a$, which is brought back toward the heater 931 side by the negative pressure of the bubble 101 before communication with the atmosphere, keeps the speed in the direction of the heater 931 by inertia even after the bubble 101 communicates with the atmosphere. The liquid (ink) falling down toward the heater 931 side reaches the surface of the heater 931 at about 5 $\mu$s after the generation of the bubble 101 as shown in FIG. 19, and spreads over the surface of the heater 931 as shown in FIG. 20.

The liquid spreading over the surface of the heater 931 has a vector in the horizontal direction along the surface of the heater 931, although since the vector in the direction intersecting the surface of the heater 931, for example, the vector in the vertical direction, disappears, the liquid tends to remain on the surface of the heater 931 so as to draw downward the above liquid which keeps the speed vector in the direction of the ejection. Thereafter, the liquid $I_b$ between the liquid spread over the surface of the heater 931 and the upper liquid (primary droplet) becomes thinner, and, as shown in FIG. 21, the liquid $I_b$ is cut at the center of the surface of the heater 931 at about 7 $\mu$s after the generation of the bubble 101, so as to be separated into the primary droplet $I_a$ keeping the speed vector in the direction of the ejection and the liquid $I_c$ spreading over the surface of the heater 931. The position of the separation is preferably inside of the liquid flow path, and more preferably, is the electrothermal transducer element (heater) 931 side rather than the ejection outlet 832 side.

The primary droplet $I_a$ is ejected from the central portion of the ejection outlet 832 without bias in the direction of the ejection and without warp in the ejection, so as to hit the predetermined position on the recording face of the recording material. The liquid $I_c$ spread over the surface of the heater 931, which was hitherto ejected as satellite droplets following the primary droplets, remains on the surface of the heater 931, and is not ejected. Therefore, since the satellite droplets can be prevented from being ejected, the spray, which is likely to be generated due to the ejection of the satellite droplets, can be prevented from being generated, so that the recording face of the recording material can reliably be prevented from being soiled by this spray. In FIGS. 19 to 21, $I_d$ designates the ink adhering to the groove (ink in the groove), and $I_e$ designates the ink remaining in the liquid flow path.

As described above, in the liquid ejection head according to the present embodiment, when the liquid is ejected in the stage of the volume decrease after the bubble has grown to the maximum volume, the direction of the primary droplets during the ejection can be stabilized by a plurality of grooves distributed relative to the center of the ejection outlet. As a consequence, a liquid ejection head having no warp in the direction of the ejection and having superior hit precision can be provided. Since the ejection can be stably performed in spite of unevenness in the bubbling at high driving frequencies, a high-speed and high definition print can be realized.

In particular, since by ejecting the liquid while the bubble is communicated, for the first time, in the stage of the volume decrease of the bubble, spray can be prevented from being generated during the liquid ejection while the bubble is communicated with the atmosphere, and the droplets can be prevented from adhering to the ejection outlet face, so that the factor of so-called sudden non-ejection can be eliminated. As another embodiment of the recording head, which can be preferably used for the present invention and in which the bubble is communicated with the atmosphere at the ejection, for example, the so-called edge shooter type, as described in Japanese Patent No. 2783647, can be mentioned.

Ink Set

In the ink set according to the present invention, at least one of the yellow ink, the cyan ink, and the black ink and the aforementioned ink having a magenta color of the present invention are included. As the coloring material contained in each of the yellow ink, the cyan ink, and the black ink, dyes and pigments can be used. As the dye, for example, the water-soluble dyes described in the Color Index, e.g., xanthene-based, triphenylmethane-based, anthraquinone-based, monoazo-based, bisazo-based, trisazo-based, and tetrazo-based, can be preferably used.

Regarding the pigment, as the black pigment ink, carbon black is preferable, and, for example, commercially available No. 2300, No. 900, MCF88, No. 40, No. 52, MA7, MA8, No. 2200B (manufactured by MITSUBISHI CHEMICAL CORPORATION), RAVEN1255 (manufactured by Columbian Carbon Co., Ltd.), REGAL400R, REGAL660R, MOGUL L (manufactured by Cabot Corporation), Color Black FW1, Color Black FW18, Color Black S170, Color Black S150, Printex 35, Printex U (manufactured by Degussa Pigments), can be used.

As the pigment used for the yellow ink, for example, C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83, can be mentioned.

As the pigment used for the cyan ink, for example, C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, and C.I. Vat Blue 6, can be mentioned.

As the ink-jet recording apparatus used for the present invention, recording apparatuses including ink storage portions such as a recording unit and an ink-cartridge containing the aforementioned ink set can also be used. Regarding the recording apparatus used for the present invention, an ink-jet recording apparatus that ejects the ink droplets by the application of thermal energy to the ink was explained as an example, although in addition to this, piezo ink-jet recording apparatuses using the piezoelectric element can also be used.

According to the research of the inventors of the present invention, when an image including a color mixed portion of a magenta ink and a cyan ink is produced using one of the magenta inks according to the first embodiment to the third embodiment and a cyan ink containing a coloring material having a copper phthalocyanine structure, the light resistance of the color mixed portion of the magenta ink and the cyan ink exceeded, by a large degree, the light resistance predicted based on the light resistance of an image of a color mixed portion produced using each magenta ink containing only one of the aforementioned coloring materials and a cyan ink containing a coloring material having a copper phthalocyanine structure. Although the reason for the aforementioned result is not clear, it is believed that the interaction between the dye molecules generated due to the mixed use of a plurality of coloring materials, etc., contributes to the significant improvement of the light resistance of the image. Furthermore, it was made clear that this effect was remarkable when, in particular, a calendered paper was used as the recording material. It was also made clear that when C.I. Acid Red 289 was included in addition to the coloring material represented by the general formula 1, there were effects of increasing the image density and improving the coloration in addition to the aforementioned effect of significantly improving the light resistance. That is, the ink set in which one of the magenta inks according to the first embodiment to the third embodiment and a cyan ink containing a coloring material having a phthalocyanine structure are included is a preferable embodiment from the viewpoint of the improvement of the light resistance of the color mixed portion of these inks.

As the cyan ink included in the aforementioned ink set, a cyan ink containing a coloring material having a copper phthalocyanine structure is used. It was known that a cyan coloring material having a copper phthalocyanine structure was superior in light resistance and color tone, although, as described above, when the cyan ink containing the aforementioned coloring material and a conventional magenta ink were used, in an image of the color mixed portion thereof, the fading of the magenta color was remarkable compared to that of the monochrome. The present invention prevents the aforementioned phenomenon from occurring, due to the composition of the magenta ink according to one of the aforementioned first to third embodiments. Herein, as specific coloring materials having a copper phthalocyanine structure, for example, C.I. Acid Blue 249, C.I. Direct Blue 86, C.I. Direct Blue 199, and C.I. Direct Blue 307, can be mentioned.

In addition to this, if necessary, the aforementioned ink set may further include a yellow ink, a black ink, etc. Herein, dyes and pigments can be used as the coloring materials contained in the yellow ink and the black ink. As the dye, for example, the water-soluble dyes described in the Color Index, e.g., xanthene-based, triphenylmethane-based, anthraquinone-based, monoazo-based, bisazo-based, trisazo-based, and tetrazo-based, can be used.

Regarding the pigment, as the black pigment, carbon black is preferable, and for example, commercially available No. 2300, No. 900, MCF88, No. 40, No. 52, MA7, MA8, No. 2200B (manufactured by MITSUBISHI CHEMICAL CORPORATION), RAVEN1255 (manufactured by Columbian Carbon Co., Ltd.), REGAL400R, REGAL660R, MOGUL L (manufactured by Cabot Corporation), Color Black FW1, Color Black FW18, Color Black S170, Color Black S150, Printex 35, Printex U (manufactured by Degussa Pigments), can be used.

As the pigment used for the yellow ink, for example, C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83, can be mentioned.

EXAMPLES

The present invention will be explained below in further detail by using Examples and Comparative Examples. In the Examples and the Comparative Examples, the ink components are on a part by weight basis unless otherwise specified.

Examples 1 to 5

The following components were mixed, sufficiently agitated, and dissolved. The resulting solutions were pressure-filtrated with a 0.20 μm filter, so that each of the inks of Examples 1 to 5 was prepared.

Ink Composition of Example 1

| | |
|---|---|
| The aforementioned Example Compound 7 as the first coloring material | 2.7 |
| The aforementioned Example Compound 8 as the second coloring material | 1.8 |
| C.I. Acid Red 289 | 0.5 |
| Glycerin | 6.0 |
| Urea | 8.0 |
| Propylene glycol | 9.0 |
| Acetylenol EH (manufactured by Kawaken Fine Chemicals Co., Ltd.) | 0.6 |
| Ethanol | 2.0 |
| Ion-exchanged water | 69.4 |

Ink Composition of Example 2

| | |
|---|---|
| The aforementioned Example Compound 1 as the first coloring material | 2.2 |
| The aforementioned Example Compound 12 as the second coloring material | 1.6 |
| 2-Pyrrolidone | 8.0 |
| Glycerin | 10.0 |
| Acetylenol EH (manufactured by Kawaken Fine Chemicals Co., Ltd.) | 1.0 |
| Ion-exchanged water | 77.2 |

Ink Composition of Example 3

| | |
|---|---|
| The aforementioned Example Compound 3 as the first coloring material | 2.2 |
| The aforementioned Example Compound 9 as the second coloring material | 1.8 |
| 1,5-Pentanediol | 7.0 |
| Urea | 8.0 |
| Acetylenol EH (manufactured by Kawaken Fine Chemicals Co., Ltd.) | 0.3 |
| Ethanol | 1.5 |
| Ion-exchanged water | 79.2 |

Ink Composition of Example 4

| | |
|---|---|
| The aforementioned Example Compound 2 as the first coloring material | 3.0 |
| C.I. Acid Red 289 as the third coloring material | 1.0 |
| Glycerin | 10.0 |
| Urea | 8.0 |
| Acetylenol EH (manufactured by Kawaken Fine Chemicals Co., Ltd.) | 0.3 |
| Ethanol | 4.0 |
| Ion-exchanged water | 73.7 |

Ink Composition of Example 5

| | |
|---|---|
| The aforementioned Example Compound 6 as the first coloring material | 2.5 |
| The aforementioned Example Compound 10 as the second coloring material | 1.5 |
| C.I. Acid Red 52 as the third coloring material | 0.3 |
| Glycerin | 10.0 |
| Diethylene glycol | 10.0 |
| Trimethylolpropane | 8.0 |
| Acetylenol EH (manufactured by Kawaken Fine Chemicals Co., Ltd.) | 0.6 |
| Isopropyl alcohol | 2.0 |
| Ion-exchanged water | 65.1 |

Comparative Examples 1 to 3

The following components were mixed, sufficiently agitated, and dissolved. The resulting solutions were pressure-filtrated with a 0.20 μm filter, so that each of the inks of Comparative Examples 1 to 3 was prepared.

Ink Composition of Comparative Example 1

| | |
|---|---|
| The aforementioned Example Compound 1 as the first coloring material | 4.0 |
| Thiodiglycol | 10.0 |
| Urea | 8.0 |
| Acetylenol EH (manufactured by Kawaken Fine Chemicals Co., Ltd.) | 1.0 |
| Ion-exchanged water | 77.0 |

Ink Composition of Comparative Example 2

| | |
|---|---|
| The aforementioned Example Compound 8 as the second coloring material | 2.9 |
| Ethylene glycol | 10.0 |
| 1,2,6-hexanetriol | 7.0 |
| Urea | 8.0 |
| Acetylenol EH (manufactured by Kawaken Fine Chemicals Co., Ltd.) | 1.0 |
| Ion-exchanged water | 71.1 |

Ink Composition of Comparative Example 3

| | |
|---|---|
| C.I. Acid Red 52 as the third coloring material | 2.5 |
| Glycerin | 10.0 |
| Urea | 8.0 |
| Acetylenol EH (manufactured by Kawaken Fine Chemicals Co., Ltd.) | 0.3 |
| Ethanol | 4.0 |
| Ion-exchanged water | 75.2 |

Evaluation

Printing was performed using the inks produced in the aforementioned Examples 1 to 5 and Comparative Examples 1 to 3, using on-demand type ink-jet printer, in which the energy source for ejection is a heater element, as the ink-jet recording apparatus. Regarding the resulting images, evaluations of (1) the coloration, (2) the image density, and (3) the light resistance were performed in accordance with the following methods and criteria. The evaluation results obtained using the coloring materials of each of the inks of Examples 1 to 5 and Comparative Examples 1 to 3, and using the inks thereof are shown in Table 1.

(1) Coloration

The printer was filled with the predetermined ink, and two kinds of recording materials, that is, a PPC paper (manufactured by CANON KABUSHIKI KAISHA) and a calendered paper (PR-101, manufactured by CANON KABUSHIKI KAISHA) were printed with solid patches. The resulting prints were air-dried for 24 hours and the colorations thereof were visually evaluated in accordance with the following criteria:

A: vivid magenta color tone

B: somewhat somber magenta color tone

C: somber magenta color tone.

(2) Image Density (2-A) The printer was filled with the predetermined ink, and a PPC paper (manufactured by CANON KABUSHIKI KAISHA) was printed with a solid patch in a manner similar to that in the aforementioned evaluation (1). The resulting print was air-dried for 24 hours, and the optical density thereof was measured with a Macbeth reflection densitometer RD-918 (trade name, manufactured by Macbeth Co.), and was evaluated in accordance with the following criteria:

A: image density is 1.2 or more

B: image density is 1.1 or more, but less than 1.2

C: image density is less than 1.1.

(2-B) The printer was filled with the predetermined ink, and a calendered paper (PR-101, manufactured by CANON KABUSHIKI KAISHA) was printed with a solid patch. The resulting print was air-dried for 24 hours, and the optical density thereof was measured with a Macbeth reflection densitometer RD-918 (trade name, manufactured by Macbeth Co.), and was evaluated in accordance with the following criteria:

A: image density is 1.9 or more

B: image density is 1.8 or more, but less than 1.9

C: image density is less than 1.8.

(3) Light Resistance

The printer was filled with the predetermined ink, and a PPC paper (manufactured by CANON KABUSHIKI KAISHA) and a calendered paper (PR-101, manufactured by CANON KABUSHIKI KAISHA) were printed with solid patches in a manner similar to that in the aforementioned evaluation (1). The resulting prints were air-dried for 24 hours, and thereafter were exposed and irradiated for 100 hours with a xenon fade meter Ci3000 (manufactured by ATLAS ELECTRIC DEVICES COMPANY), mounted with an ultraviolet cut filter, at a temperature of 35° C. in the cell, at a relative humidity of 60%, and with an irradiation strength of 60 klux. The densities of the solid patches of the prints before and after the examination were measured with a Macbeth reflection densitometer RD-918 (trade name, manufactured by Macbeth Co.), the density retention rate was thereby determined, and the light resistance was evaluated in accordance with the following criteria:

A: density retention rate is 80% or more

B: density retention rate is 60% or more, but less than 80%

C: density retention rate is less than 60%.

As is clear from the aforementioned Table 1, the ink of Comparative Example 1 containing the coloring material represented by the general formula 1 only was excellent in coloration on the calendered paper, although it was insufficient in coloration on the PPC paper, and was insufficient in image density on the calendered paper and the PPC paper. The ink of Comparative Example 2 containing the coloring material represented by the general formula 2 only and the ink of Comparative Example 3 containing the xanthene dye only could not form images having sufficient light resistance on the PPC paper and the calendered paper. On the other hand, the ink containing the coloring material represented by the general formula 1 and the coloring material represented by the general formula 2, the ink further containing the xanthene dye in addition thereto, and the ink containing the coloring material represented by the general formula 1 and the xanthene dye of Examples 1 to 5 exhibited improved coloration, image density, and light resistance compared to those predicted based on the inks each using only one of the coloring materials used in the aforementioned inks, and as shown in Table 1, the evaluation results thereof were excellent regarding every evaluation item.

Examples 6 to 10 and
Comparative Examples 4 to 6

| Composition of Magenta Ink 1 | |
| --- | --- |
| The aforementioned Example Compound 1 included in the general formula 1 | 3.0 |
| The aforementioned Example Compound 12 included in the general formula 2 | 1.0 |
| Glycerin | 10.0 |
| Urea | 5.0 |
| Diethylene glycol | 8.0 |
| Acetylenol EH (manufactured by Kawaken Fine Chemicals Co., Ltd.) | 1.0 |
| Ion-exchanged water | 72.0 |

TABLE 1

Evaluation Results

| | | Coloration | | Image Density | | Light Resistance | |
| --- | --- | --- | --- | --- | --- | --- | --- |
| | | PPC Paper | Calendered Paper | PPC Paper | Calendered Paper | PPC Paper | Calendered Paper |
| Example 1 | Example Compound 7 Example Compound 8 C.I. Acid Red 289 | A | A | A | A | A | A |
| Example 2 | Example Compound 1 Example Compound 12 | A | A | A | A | A | A |
| Example 3 | Example Compound 3 Example Compound 9 | A | A | A | A | A | A |
| Example 4 | Example Compound 2 C.I. Acid Red 289 | A | A | A | A | A | A |
| Example 5 | Example Compound 6 Example Compound 10 C.I. Acid Red 52 | A | A | A | A | A | A |
| Comparative Example 1 | Example Compound 1 | B | A | C | C | A | A |
| Comparative Example 2 | Example Compound 8 | A | A | A | A | B | B |
| Comparative Example 3 | C.I. Acid Red 52 | A | A | A | A | C | C |

-continued

| Composition of Magenta Ink 2 | |
|---|---|
| The aforementioned Example Compound 1 included in the general formula 1 | 2.5 |
| C.I. Reactive Red 180 | 1.0 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 71.2 |

Composition of Magenta Ink 3

| | |
|---|---|
| The aforementioned Example Compound 2 included in the general formula 1 | 3.5 |
| The aforementioned Example Compound 8 included in the general formula 2 | 0.5 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 70.7 |

Composition of Magenta Ink 4

| | |
|---|---|
| The aforementioned Example Compound 7 included in the general formula 1 | 3.0 |
| The aforementioned Example Compound 8 included in the general formula 2 | 1.0 |
| C.I. Acid Red 289 | 0.1 |
| Glycerin | 10.0 |
| Urea | 8.0 |
| Diethylene glycol | 7.0 |
| Acetylenol EH (manufactured by Kawaken Fine Chemicals Co., Ltd.) | 1.0 |
| Ion-exchanged water | 69.9 |

Composition of Magenta Ink 5

| | |
|---|---|
| The aforementioned Example Compound 3 included in the general formula 1 | 4.0 |
| C.I. Acid Red 289 | 0.1 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 70.6 |

Composition of Magenta Ink 6

| | |
|---|---|
| The aforementioned Example Compound 8 included in the general formula 2 | 3.0 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 71.7 |

Composition of Magenta Ink 7

| | |
|---|---|
| C.I. Reactive Red 180 | 3.5 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 71.2 |

Composition of Magenta Ink 8

| | |
|---|---|
| C.I. Acid Red 289 | 1.5 |
| C.I. Reactive Red 180 | 2.0 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 71.2 |

Composition of Cyan Ink 1

| | |
|---|---|
| C.I. Direct Blue 199 | 3.0 |
| Glycerin | 5.0 |
| Urea | 5.0 |
| Diethylene glycol | 10.0 |
| Acetylenol EH (manufactured by Kawaken Fine Chemicals Co., Ltd.) | 0.3 |
| Ethanol | 5.0 |
| Ion-exchanged water | 71.7 |

Composition of Cyan Ink 2

| | |
|---|---|
| C.I. Direct Blue 307 | 3.5 |
| Glycerin | 5.0 |
| Urea | 5.0 |
| Diethylene glycol | 10.0 |
| Acetylenol EH (manufactured by Kawaken Fine Chemicals Co., Ltd.) | 1.0 |
| Ion-exchanged water | 75.5 |

The ink sets of Examples 6 to 10 and Comparative Examples 4 to 6 were produced using the magenta inks 1 to 8 and the cyan inks 1 and 2, produced as described above, in accordance with the combinations as shown in the following Table 2.

TABLE 2

| | Magenta Ink | Cyan Ink |
|---|---|---|
| Example 6 | 1 | 2 |
| Example 7 | 2 | 1 |
| Example 8 | 3 | 1 |
| Example 9 | 4 | 2 |
| Example 10 | 5 | 1 |
| Comparative Example 4 | 6 | 1 |
| Comparative Example 5 | 7 | 1 |
| Comparative Example 6 | 8 | 1 |

Evaluation

Printing was performed using the ink sets produced in the aforementioned Examples 6 to 10 and Comparative Examples 4 to 6, using an on-demand type ink-jet printer, in which the energy source for ejection is a heater element, as the ink-jet recording apparatus so as to produce the prints. Regarding the resulting prints, evaluations of the light resistance were performed in accordance with the following method and criteria.

Light Resistance

The printer was filled with the predetermined ink, and a PPC paper (manufactured by CANON KABUSHIKI KAISHA) and a calendered paper (PR-101, manufactured by CANON KABUSHIKI KAISHA) were printed with solid patches of a magenta monochrome portion and a color mixed portion (blue) of the magenta and the cyan. The resulting prints were air-dried for 24 hours, and thereafter were exposed and irradiated for 100 hours with a xenon fade meter Ci3000 (manufactured by ATLAS ELECTRIC DEVICES COMPANY), mounted with an ultraviolet cut filter, at a temperature of 35° C. in the cell, at a relative humidity of 60%, and with an irradiation strength of 60 klux. The solid patches of the prints before and after the examination were measured with a Spectrodensitometer X-rite 938 (trade name, manufactured by X-rite Co.) so as to determine L*a*b. The color differences between before and after the examination were thereby determined, and the light resistances were evaluated in accordance with the following criteria. The results thereof are shown in Table 3.

A: ΔE≦5 no difference was visually observed between before and after the examination B: 5<ΔE≦15 a little difference was visually observed between before and after the examination C: 15<ΔE a large difference was visually observed between before and after the examination.

TABLE 3

Evaluation Results of the Light Resistance of the Prints according to Examples 6 to 10 and Comparative Examples 4 to 6

| | Monochrome Portion | | Color Mixed Portion | |
| --- | --- | --- | --- | --- |
| | PPC Paper | Calendered Paper | PPC Paper | Calendered Paper |
| Example 6 | B | A | B | A |
| Example 7 | B | B | B | B |
| Example 8 | A | A | A | A |
| Example 9 | B | A | B | A |
| Example 10 | A | A | A | A |
| Comparative Example 4 | C | C | C | C |
| Comparative Example 5 | B | B | C | C |
| Comparative Example 6 | C | B | C | C |

As described above, according to an aspect of the present invention, an ink having a vivid magenta color tone and a high image density, which can produce an image having superior light resistance when printed on various recording papers, as well as a recording method, a recording unit, an ink cartridge, an ink set, and a recording apparatus can be provided.

Furthermore, according to another aspect of the present invention, an ink set in which the light resistance of an image including a color mixed portion of a magenta ink and a cyan ink containing a dye having a phthalocyanine structure can be improved, and an ink-jet recording method, a recording unit, an ink cartridge, and an ink-jet recording apparatus can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising:

a first coloring material represented by the following general formula 1;

a second coloring material represented by the following general formula 2; and an aqueous medium,

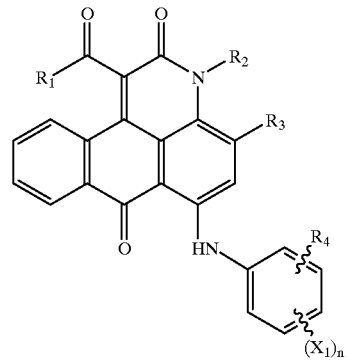

General formula 1 wherein $R_1$ represents a substituted or unsubstituted alkoxy group, or a substituted or unsubstituted aryl group, $R_2$ and $R_4$ represent, independently, a hydrogen atom, or a substituted or unsubstituted alkyl group, $R_3$ represents a substituent selected from the group consisting of a hydrogen atom, a substituted or unsubstituted alkyl group, a substituted or unsubstituted alkoxy group, a substituted or unsubstituted aryloxy group, and a halogen atom, $X_1$ represents a carboxyl group or a salt thereof, or a sulfonic acid group or a salt thereof, and n represents 1 or 2;

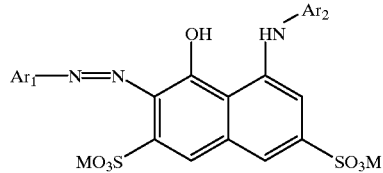

General formula 2 wherein $Ar_1$ represents a substituted or unsubstituted phenyl group, or a substituted or unsubstituted naphthyl group, $Ar_2$ represents an acetyl group, a benzoyl group, a 1,3,5-triazinyl group, a $SO_2$—$C_6H_5$ group, or a $SO_2$—$C_6H_4$—$CH_3$ group, M represents a counter ion to a sulfonic acid group that is selected from the group consisting of a hydrogen atom, an alkali metal, an ammonium, and an organic ammonium.

2. The ink according to claim 1, further comprising at least one of C.I. Acid Red 52 and C.I. Acid Red 289 as a third coloring material.

3. The ink according to claim 2, wherein said third coloring material is C.I. Acid Red 289.

4. An ink comprising:

at least one of C.I. Acid Red 52 and C.I. Acid Red 289;

a coloring material represented by the following general formula 1; and an aqueous medium,

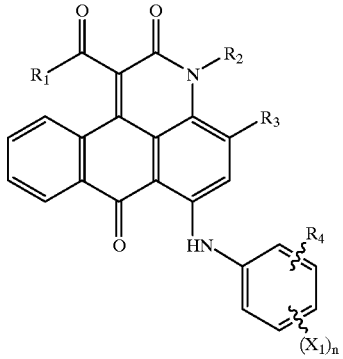

General formula 1 wherein $R_1$ represents a substituted or unsubstituted alkoxy group, or a substituted or unsubstituted aryl group, $R_2$ and $R_4$ represent, independently, a hydrogen atom or a substituted or unsubstituted alkyl group, $R_3$ represents a substituent selected from the group consisting of a hydrogen atom, a substituted or unsubstituted alkyl group, a substituted or unsubstituted alkoxy group, a substituted or unsubstituted aryloxy group, and a halogen atom, $X_1$ represents a carboxyl group or a salt thereof, or a sulfonic acid group or a salt thereof, and n represents 1 or 2.

5. The ink according to any one of claims 1 to 4, wherein one of said coloring materials has at least one carboxyl group or a salt thereof, and said ink has a pH within a range of 7.0 to 11.0.

6. The ink according to any one of claims 1 to 4, wherein none of said coloring materials have a carboxyl group or a salt thereof, and said ink has a pH within a range of 4.0 to 11.0.

7. The ink according to any one of claims 1 to 4, wherein the total content of said coloring materials is within a range of 0.1% to 15.0% by weight of the total weight of the ink.

8. The ink according to any one of claims 1 to 4, wherein the ink contains water at an amount within a range of 30% to 95% of the total weight of the ink.

9. The ink according to any one of claims 1 to 4, wherein said ink is used for ink-jet recording.

10. An ink set comprising:
at least one ink selected from the group consisting of yellow ink, cyan ink, and black ink; and
the magenta ink according to any one of claims 1 to 4.

11. The ink set according to claim 10, wherein said ink set is used for ink-jet recording.

12. An ink set comprising:
cyan ink, and
the magenta ink according to any one of claims 1 to 4.

13. The ink set according to claim 12, wherein said cyan ink comprises a coloring material having a copper phthalocyanine structure.

14. The ink set according to claim 12, wherein said ink set is used for ink-jet recording.

15. An ink-jet recording method, comprising a step of ejecting said ink according to claim 9 from an orifice in response to a recording signal.

16. An ink-jet recording method according to claim 15, wherein said method further comprises a sub-step of ejecting said ink from said orifice by applying thermal energy to said ink.

17. An ink-jet recording method, comprising the steps of:
(i) ejecting said magenta ink according to claim 9 from an orifice in response to a recording signal; and (ii) ejecting cyan ink comprising a dye having a copper phthalocyanine structure from an orifice in response to a recording signal.

18. The ink-jet recording method according to claim 17, wherein at least one of the step (i) and step (ii) comprises a sub-step of ejecting said ink from said orifice by applying thermal energy to said ink.

19. The ink-jet recording method according to claim 17, wherein step (i) and step (ii) are conducted so that the magenta ink and the cyan ink overlap each other on a recording material.

20. The ink-jet recording method according to claim 19, wherein at least one of step (i) and step (ii) comprises a sub-step of ejecting said ink from said orifice by applying thermal energy to said ink.

21. A recording unit comprising:
an ink storage portion storing said ink according to claim 9, and
a head portion for ejecting said ink.

22. A recording unit, comprising:
an ink storage portion storing each of at least one ink selected from the group consisting of yellow ink, cyan ink, and black ink, and magenta ink according to any one of claims 1 to 4, and
a head portion for ejecting said respective inks.

23. The recording unit according to claim 22, wherein said head portion comprises a head that ejects said ink by applying thermal energy to said ink.

24. A recording unit comprising:
an ink storage portion storing cyan ink, and magenta ink according to any one of claims 1 to 4, respectively, and
a head portion for ejecting said respective inks.

25. The recording unit according to claim 24, wherein said cyan ink comprises a copper phthalocyanine structure.

26. The recording unit according to claim 24, wherein said head portion comprises a head that ejects said ink by applying thermal energy to said ink.

27. An ink cartridge comprising an ink storage portion storing said ink according to any one of claims 1 to 4.

28. An ink cartridge, comprising an ink storage portion storing at least one ink selected from the group consisting of yellow ink, cyan ink, and black ink, and said magenta ink according to any one of claims 1 to 4.

29. An ink cartridge comprising an ink storage portion storing cyan ink, and magenta ink according to any one of claims 1 to 4.

30. The ink cartridge according to claim 29, wherein said cyan ink comprises a coloring material having a copper phthalocyanine structure.

31. An ink-jet recording apparatus comprising a recording unit comprising:
an ink storage portion storing said ink according to claim 9, and
a head portion for ejecting said ink.

32. An ink-jet recording apparatus according to claim 31, wherein said head portion ejects said ink by applying thermal energy to said ink.

33. An ink-jet recording apparatus comprising:
a recording head for ejecting said ink according to claim 9;
an ink cartridge comprising an ink storage portion storing said ink; and
an ink supply portion for supplying said ink from said ink cartridge to said recording head.

34. An ink-jet recording apparatus according to claim 33, wherein said recording head ejects said ink by applying thermal energy to said ink.

35. An ink-jet recording apparatus comprising:
at least one ink for ink-jet recording, selected from the group consisting of yellow ink, cyan ink, and black ink,
a magenta ink according to claim 9, and
a recording head for ejecting each of said inks.

36. An ink-jet recording apparatus according to claim 35, wherein said recording head ejects said inks by applying thermal energy to said inks.

37. An ink-jet recording apparatus according to claim 35, wherein said cyan ink comprises a dye having a phthalocyanine structure.

38. An ink-jet recording apparatus according to claim 37, wherein said recording head ejects said inks by applying thermal energy to said inks.

39. An ink-jet recording apparatus comprising:
cyan ink,
an ink having a magenta color according to claim 9, and
a recording head for ejecting each of said inks.

40. An ink-jet recording apparatus according to claim 39, wherein said recording head ejects said inks by applying thermal energy to said inks.

41. An ink-jet recording apparatus according to claim 39, wherein said cyan ink comprises a dye having a phthalocyanine structure.

42. An ink-jet recording apparatus according to claim 41, wherein said recording head ejects said inks by applying thermal energy to said inks.

* * * * *